US010089686B2

(12) United States Patent
Straub et al.

(10) Patent No.: US 10,089,686 B2
(45) Date of Patent: Oct. 2, 2018

(54) SYSTEMS AND METHODS FOR INCREASING EFFICIENCY IN THE DETECTION OF IDENTITY-BASED FRAUD INDICATORS

(71) Applicant: LexisNexis Risk Solutions FL Inc., Boca Raton, FL (US)

(72) Inventors: Scott M. Straub, Silver Spring, MD (US); Andrew John Bucholz, Alexandria, VA (US); Marlene L. Thorogood, Boca Raton, FL (US); Lea Smith, Savage, MN (US); Jennifer Paganacci, Delray Becah, FL (US); Monty Faidley, Kennesaw, GA (US); Steve Lappenbusch, Beaverton, OR (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 379 days.

(21) Appl. No.: 14/949,140

(22) Filed: Nov. 23, 2015

(65) Prior Publication Data

US 2016/0086262 A1    Mar. 24, 2016

Related U.S. Application Data

(63) Continuation-in-part of application No. 14/667,977, filed on Mar. 25, 2015, which is a
(Continued)

(51) Int. Cl.
*G07F 19/00*    (2006.01)
*G07B 17/00*    (2006.01)
(Continued)

(52) U.S. Cl.
CPC ....... *G06Q 40/025* (2013.01); *G06Q 20/4016* (2013.01); *G06Q 50/265* (2013.01); *G06Q 20/04* (2013.01)

(58) Field of Classification Search
CPC ........ G06Q 40/00; G06Q 20/40; G06Q 20/04; G06Q 50/265; G06F 17/30; G06B 15/00
(Continued)

(56) References Cited

U.S. PATENT DOCUMENTS 6,401,066 B1    6/2002  Mcintosh
6,993,502 B1    1/2006  Gryglewicz et al.
(Continued)

OTHER PUBLICATIONS

Continuous Fraud Detection in Enterprise Systems through Audit Trail Analysis, Best et al., The Journal of Digital Forensics JDFSL 4.1, pp. 39-60 (2009).
(Continued)

*Primary Examiner* — Olusegun Goyea
(74) *Attorney, Agent, or Firm* — Troutman Sanders LLP; James E. Schutz; Mark Lehi Jones

(57) ABSTRACT

Certain embodiments of the disclosed technology include systems and methods for increasing efficiency in the detection of identity-based fraud indicators. A method is provided that includes: receiving entity-supplied information comprising at least a name, a social security number (SSN), and a street address associated with a request for a payment or a benefit; querying one or more databases with the entity-supplied information; receiving a plurality of information in response to the querying; determining a validity indication of the entity supplied information; creating disambiguated entity records; determining relationships among the disambiguated records; scoring, based at least in part on determining the relationships among the disambiguated entity records, at least one parameter of the entity-supplied infor-
(Continued)

mation; determining one or more indicators of fraud based on the scoring; and outputting, for display, one or more indicators of fraud.

20 Claims, 7 Drawing Sheets

Related U.S. Application Data continuation-in-part of application No. 14/170,892, filed on Feb. 3, 2014, which is a continuation of application No. 13/541,157, filed on Jul. 3, 2012, now Pat. No. 8,682,755.

(60) Provisional application No. 61/970,603, filed on Mar. 26, 2014.

(51) Int. Cl.
*G06Q 40/02* (2012.01)
*G06Q 20/40* (2012.01)
*G06Q 50/26* (2012.01)
*G06Q 20/04* (2012.01)

(58) Field of Classification Search
USPC ....... 705/38, 44, 50; 235/379; 707/602, 607, 707/E17.005
See application file for complete search history.

(56) References Cited

U.S. PATENT DOCUMENTS

| | | |
|---|---|---|
| 7,251,625 B2 | 7/2007 | Lee et al. |
| 7,333,635 B2 | 2/2008 | Tsantes et al. |
| 7,398,925 B2 | 7/2008 | Tidwell et al. |
| 7,461,258 B2 | 12/2008 | Rolfe |
| 7,579,965 B2 | 8/2009 | Bucholz |
| 7,590,572 B2 | 9/2009 | Larson |
| 7,624,031 B2 | 11/2009 | Simpson et al. |
| 7,661,585 B2 | 2/2010 | Joao |
| 7,720,846 B1 | 5/2010 | Bayliss |
| 7,769,738 B2 | 8/2010 | Ramberg |
| 7,779,456 B2 | 8/2010 | Dennis et al. |
| 7,904,337 B2 | 3/2011 | Morsa |
| 7,905,396 B2 | 3/2011 | Tidwell et al. |
| 7,937,319 B2 | 5/2011 | Kennis et al. |
| 8,055,518 B2 | 11/2011 | Prieston |
| 8,176,044 B2 | 5/2012 | Edala et al. |
| 8,306,970 B2 | 11/2012 | Drubner |
| 8,423,434 B2 | 4/2013 | Ramsey et al. |
| 2003/0115459 A1 | 6/2003 | Monk |
| 2004/0064415 A1* | 4/2004 | Abdallah ............. G06Q 50/265 705/50 |
| 2004/0111377 A1 | 6/2004 | Teberg et al. |
| 2005/0033690 A1 | 2/2005 | Antognini et al. |
| 2005/0096989 A1 | 5/2005 | Ostlund |
| 2005/0285721 A1 | 12/2005 | Bucholz et al. |
| 2006/0149674 A1* | 7/2006 | Cook ..................... G06O 20/40 705/44 |
| 2006/0245622 A1 | 11/2006 | Tedesco et al. |
| 2007/0208681 A1 | 9/2007 | Bucholz |
| 2007/0213992 A1 | 9/2007 | Anderson et al. |
| 2008/0046368 A1* | 2/2008 | Tidwell ................ G06Q 20/042 705/44 |
| 2009/0187500 A1 | 7/2009 | Wilson et al. |
| 2010/0241558 A1 | 9/2010 | Chmielewski et al. |
| 2010/0257092 A1* | 10/2010 | Einhorn ............ G06F 17/30598 705/38 |
| 2010/0332362 A1 | 12/2010 | Ramsey et al. |
| 2011/0047628 A1 | 2/2011 | Viars |
| 2011/0131052 A1 | 6/2011 | Bucholz |
| 2011/0191335 A1 | 8/2011 | Miller et al. |
| 2012/0030080 A1 | 2/2012 | Slater |
| 2012/0130853 A1 | 5/2012 | Petri et al. |
| 2012/0197771 A1 | 8/2012 | Wilson et al. |
| 2012/0197879 A1 | 8/2012 | Edala et al. |
| 2012/0226591 A1 | 9/2012 | Ramsey et al. |
| 2012/0296925 A1 | 11/2012 | Mehra et al. |
| 2013/0060809 A1 | 3/2013 | Drubner |
| 2013/0066826 A1* | 3/2013 | McDonald ........ G06F 17/30563 707/602 |
| 2013/0218797 A1 | 8/2013 | Prichard et al. |

OTHER PUBLICATIONS

International Search Report and Written Opinion, PCT/US2013/049045, dated Jan. 10, 2014.

* cited by examiner

SYSTEMS AND METHODS FOR INCREASING EFFICIENCY IN THE DETECTION OF IDENTITY-BASED FRAUD INDICATORS

CROSS REFERENCE TO RELATED APPLICATIONS

This application is a Continuation-in-Part under 37 C.F.R. 1.53(b) of U.S. Non-Provisional patent application Ser. No. 14/667,977, entitled "Systems and Methods for Estimating Probability of Identity-Based Fraud, filed 25 Mar. 2015, and published as U.S. Patent Publication No. 20150199784 on 16 Jul. 2015, the contents of which are hereby incorporated by reference in its entirety. U.S. Non-Provisional patent application Ser. No. 14/667,977 claims priority under 35 U.S.C. § 119(e) to U.S. Provisional Patent Application No. 61/970,603, filed 26 Mar. 2014, entitled "Systems and Methods for Estimating Probability of Identity-Based Fraud," the contents of which are hereby incorporated by reference in its entirety. U.S. Non-Provisional patent application Ser. No. 14/667,977 is also a Continuation-in-Part under 37 C.F.R. 1.53(b) of U.S. Non-Provisional patent application Ser. No. 14/170,892, filed 3 Feb. 2014, and entitled "Systems and Methods for Detecting Fraud," published as U.S. Patent Application Publication No. US2014/0149304 on 29 May 2014, the contents of which are hereby incorporated by reference in its entirety. Application Ser. No. 14/170,892 is a Continuation of U.S. patent application Ser. No. 13/541,157, filed 3 Jul. 2012, and entitled "Systems and Methods for Detecting Tax Refund Fraud," and issued as U.S. Pat. No. 8,682,755 on 25 Mar. 2014, the contents of which are hereby incorporated by reference in its entirety.

The following applications are also incorporated by reference in their entirety, as if presented in full:
- U.S. patent application Ser. No. 12/637,286, entitled "METHOD AND SYSTEM FOR LINKING AND DELINKING DATA RECORDS," filed 14 Dec. 2009, and published 15 Apr. 2010 as U.S. Patent Publication No. 20100094910, now U.S. Pat. No. 9,015,171, issued 1 Apr. 2015.
- U.S. patent application Ser. No. 12/496,948, entitled "ENTITY REPRESENTATION IDENTIFICATION USING ENTITY REPRESENTATION LEVEL INFORMATION," filed 2 Jul. 2009, and published 14 Jan. 2010 as U.S. Patent Publication No. 20100010988, now U.S. Pat. No. 8,661,026, issued 25 Feb. 2014.
- U.S. patent application Ser. No. 12/496,876, entitled "SYSTEM AND METHOD FOR IDENTIFYING ENTITY REPRESENTATIONS BASED ON A SEARCH QUERY USING FIELD MATCH TEMPLATES," filed 2 Jul. 2009, and published 7 Jan. 2010 as U.S. Patent Publication No. 20100005078, now U.S. Pat. No. 8,285,725, issued 9 Oct. 2012.
- U.S. patent application Ser. No. 12/496,888, entitled "BATCH ENTITY REPRESENTATION IDENTIFICATION USING FIELD MATCH TEMPLATES," filed 2 Jul. 2009, and published 7 Jan. 2010 as U.S. Patent Publication No. 20100005056, now U.S. Pat. No. 8,484,211, issued 9 Jul. 2013.
- U.S. patent application Ser. No. 12/188,742, entitled "DATABASE SYSTEMS AND METHODS FOR LINKING RECORDS AND ENTITY REPRESENTATIONS WITH SUFFICIENTLY HIGH CONFIDENCE," filed 8 Aug. 2008, and published 29 Oct. 2009 as U.S. Patent Publication No. 20090271424, now U.S. Pat. No. 8,266,168, issued 11 Sep. 2013.

FIELD

The disclosed technology generally relates to detection of fraud indicators, and in particular, to systems and methods for increasing efficiency in the detection of identity-based fraud indicators.

BACKGROUND

Businesses and governmental agencies face a number of growing problems associated with identity-based fraud. For example, fraudsters can apply for credit, payments, benefits, tax refunds, etc. by misrepresenting their identity, by stealing and using identity information from another individual, or by using an identity of a deceased person. The associated revenue loss to the businesses and/or government agencies can be significant, and the process of verifying the legitimacy of the requester's identity can create costly delays.

Technically well-informed fraud perpetrators with sophisticated deception schemes are likely to continue targeting business and governmental entities, particularly if fraud detection and prevention mechanisms are not in place. Balancing the threats of identity fraud with efficient service for legitimate requests creates a significant challenge.

BRIEF SUMMARY

Some or all of the above needs may be addressed by certain embodiments of the disclosed technology. Certain embodiments of the disclosed technology may include systems and methods for increasing efficiency in the detection of identity-based fraud indicators.

According to an exemplary embodiment of the disclosed technology, a system, method, and computer readable media is provided for receiving, from a first information source, entity-supplied information including at least a name, a social security number (SSN), and a street address associated with a request for a payment or a benefit. The entity-supplied information is based at least in part on information provided by an entity who is represented as a natural person. The method includes querying one or more public or private databases with the entity-supplied information; receiving, from a second information source that is independent of the first information source, a plurality of independent information in response to the querying, where the plurality of independent information is not provided by the entity. The method further includes determining, with one or more computer processors in communication with a memory, based at least in part on a comparison of the entity-supplied information with at least a portion of the plurality of independent information, a first validity indication of the entity-supplied information; creating, with the one or more computer processors, disambiguated entity records responsive to the first validity indication by one or more of: performing data cleansing on one or more of the entity-supplied information and the plurality of independent information to eliminate one or more name variations; and adding metadata record to one or more of the entity-supplied information and the plurality of independent information. The method further includes determining, with the one or more computer processors, relationships among the disambiguated entity records by one or more of: creating a core join data structure with at least a portion of all available disambiguated entity records; splitting the core join data structure into persisted parts; and clustering one or more of the persisted parts and the disambiguated entity records. The method further includes scoring, with the one or more computer processors and based at least in part on determining the relationships among the disambiguated entity records, at least one parameter of the entity-supplied information; determining, with the one or more computer processors, one or more indicators of fraud based on the scoring of the at least one parameter; and outputting, for display, one or more indicators of fraud.

According to an example implementation of the disclosed technology, the system includes at least one memory for storing data and computer-executable instructions; and at least one processor configured to access the at least one memory and further configured to execute the computer-executable instructions for processing the method described above.

Certain example implementations of the disclosed technology can include one or more computer readable media comprising computer-executable instructions that, when executed by one or more processors, configure the one or more processors to perform the method described above.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
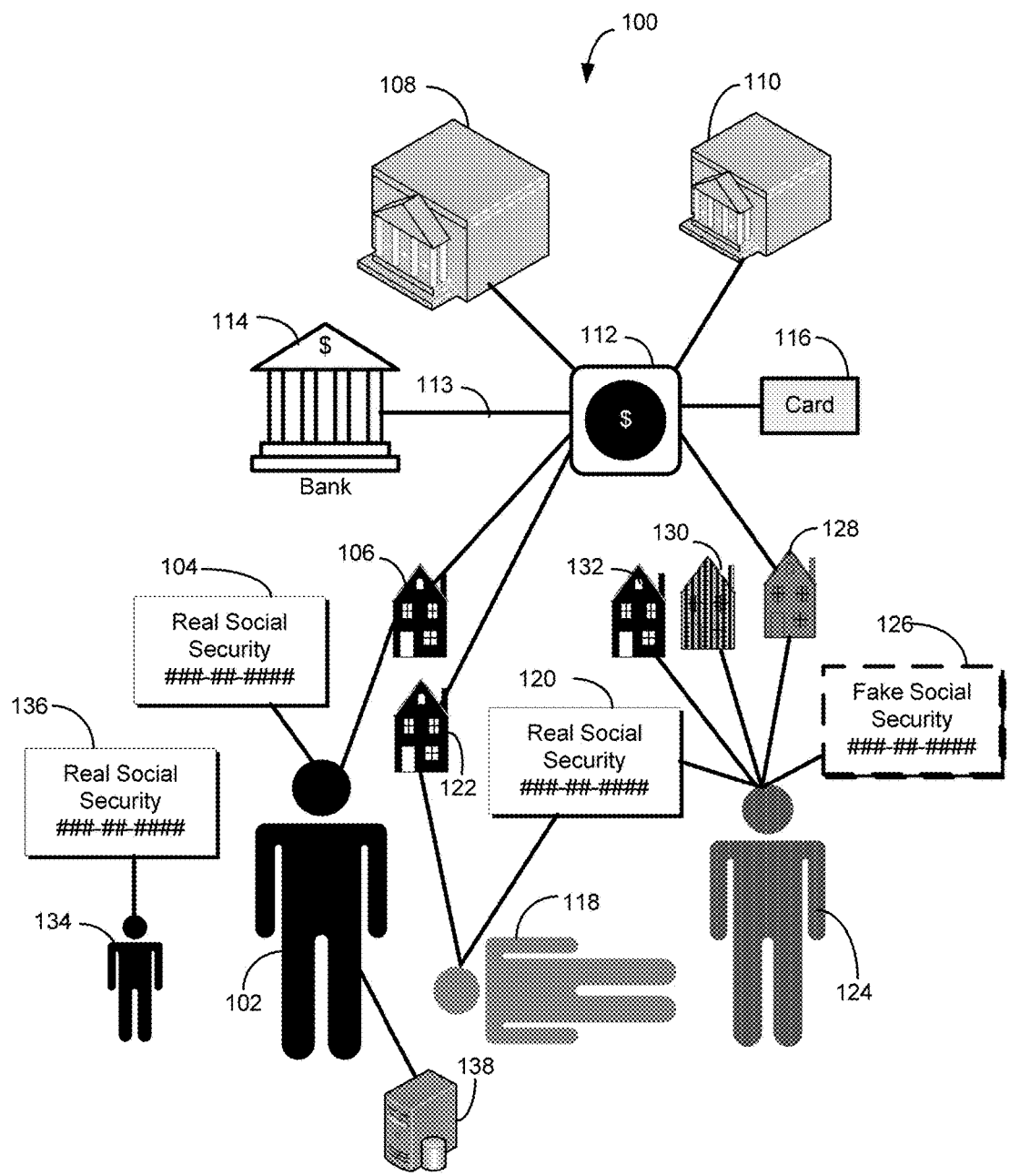
FIG. 1 is a block diagram of various illustrative scenarios associated with a request for payment or benefit, according to exemplary embodiments of the disclosed technology.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain example embodiments of the disclosed technology may utilize a model to build a profile of indicators of fraud that may be based on multiple variables. In certain example implementations of the disclosed technology, the interaction of the indicators and variables may be utilized to produce one or more scores indicating the likelihood or probability of fraud associated with a request for a payment or a benefit.

According to an example implementation, input information, as supplied by an entity requesting payment or a benefit may include a name, a street address, and a social security number. This input information may be utilized as input to find related information in one or more public or private databases in order to assess the risk of identity-related fraud. Example embodiments of the disclosed technology may be utilized to score indicators of fraud.

For example, in one aspect, addresses associated with the entity and their closest relatives or associates may be may be analyzed to determine distances between the addresses. For example, the greater distance may indicate a higher the likelihood of fraud because, for example, a fraudster may conspire with a relative or associate in another city, and may assume that their distance may buffer them from detection.

Certain example embodiments of the disclosed technology may utilize profile information related to an entity's neighborhood. For example, information such as density of housing (single family homes, versus apartments and condos), the presence of businesses, and the median income of the neighborhood may correlate with a likelihood of fraud. For example, entities living in affluent neighborhoods are less likely to be involved with fraud, whereas dense communities with lower incomes and lower presence of businesses may be more likely to be associated with fraud.

Embodiments of the disclosed technology may assesses the validity of the input identity elements, such as the name, street address, social security number (SSN), phone number, date of birth (DOB), etc., to verify whether or not requesting entity input information corresponds to real identity. Certain example implementations may utilize a correlation between the input SSN and the input address, for example, to determine how many times the input SSN has been associated with the input address via various sources. Typically, the lower the number, then the higher the probability of fraud.

Certain example implementations of the disclosed technology may determine the number of unique SSNs associated with the input address. Such information may be helpful in detecting identity-related fraud, and may also be helpful in finding fraud rings because the fraudsters have typically created synthetic identities, but are requesting all payments be sent to one address.

Certain example implementations may determine the number of sources reporting the input SSN with the input name. If such occurrences are rare, then this is an indication of another synthetic identity being created and used.

Certain example implementations may determine the number of SSNs associated with the identities in one or more public or private databases. For example, if the SSN has been associated with multiple identities, then it is likely a compromised SSN and the likelihood of fraud increases.

According to an example implementation, the disclosed technology may be utilized to verify the validity of the input address. For example, if the input address has never been seen in public records, then it is probably a fake address and the likelihood of fraud increases Certain example implementations of the disclosed technology may be utilized to determine if the input data provided by the requesting entity corresponds to a deceased person, a currently incarcerated person, a person having prior incarceration (and time since their incarceration), and/or whether the person has been involved in bankruptcy. For example, someone involved in a bankruptcy may be less likely to be a fraudster.

Certain embodiments of the disclosed technology may enable the detection of possible, probable, and/or actual identity-related fraud, for example, as associated with a request for credit, payment, or a benefit. Certain example implementations provide for disambiguating input information and determining a likelihood of fraud. In certain example implementations, the input information may be received from a requesting entity in relation to a request for credit, payment, or benefit. In certain example implementations, the input information may be received from a requesting entity in relation to a request for a payment or benefit from a governmental agency.

In accordance with an example implementation of the disclosed technology, input information associated with a requesting entity may be processed, weighted, scored, etc., for example, to disambiguate the information. Certain implementations, for example, may utilize one or more input data fields to verify or correct other input data fields. In certain example implementations, disambiguation may involve a process of data cleansing, for example, by eliminating ambiguity and/or name variations. Certain example implementations of disambiguation may be performed by adding metadata records to the data set that unambiguously identify entities and allows for alternate names.

In a exemplary embodiment, a request for a payment or benefit may be received by the system. For example, the request may be for a tax refund. In one example embodiment, the request may include a requesting person's name, street address, and social security number (SSN), where the SSN has a typographical error (intentional or unintentional). In this example, one or more public or private databases may be searched to find reference records matching the input information. But since the input SSN is wrong, a reference record may be returned matching the entity-supplied name and street address, but with a different associated SSN. According to certain example implementations, the entity-supplied input information may be flagged, weighted, scored, and/or corrected based on one or more factors or attributes, including but not limited to: fields in the reference record(s) having field values that identically match, partially match, mismatch, etc, the corresponding entity-supplied field values.

Example embodiments of the disclosed technology may reduce false positives and increase the probability of identifying and stopping fraud based on a customized identity-based fraud score. According to an example implementation of the disclosed technology, a model may be utilized to process identity-related input information against reference information (for example, as obtained from one or more public or private databases) to determine whether the input identity being presented corresponds to a real identity, the correct identity, and/or a possibly fraudulent identity.

Certain example implementations of the disclosed technology may determine or estimate a probability of identity-based fraud based upon a set of parameters. In an example implementation, the parameters may be utilized to examine the input data, such as name, address and social security number, for example, to determine if such data corresponds to a real identity. In an example implementation, the input data may be compared with the reference data, for example, to determine field value matches, mismatches, weighting, etc. In certain example implementations of the disclosed technology, the input data (or associated entity record) may be scored to indicate the probability that it corresponds to a real identity.

In some cases, a model may be utilized to score the input identity elements, for example, to look for imperfections in the input data. For example, if the input data is scored to have a sufficiently high probability that it corresponds to a real identity, even though there may be certain imperfections in the input or reference data, once these imperfections are found, the process may disambiguate the data. For example, in one implementation, the disambiguation may be utilized to determine how many other identities are associated with the input SSN. According to an example implementation, a control for relatives may be utilized to minimize the number of similar records, for example, as may be due to Jr. and Sr. designations.

In an example implementation, the entity-supplied input data may be utilized to derive a date-of-birth for the requesting entity, for example, based on matching reference records. In one example implementation, the derived date-of-birth may be compared with the issue date of the SSN. If the dates of the SSN are before the DOB, then the flag may be appended for this record as indication of fraud.

Another indication of fraud that may be determined, according to an example implementation, includes whether the entity has previously been associated with a different SSN. In an example implementation, a "most accurate" SSN for the entity may be checked to determine whether the entity is a prisoner, and if so the record may be flagged. In an example implementation, the input data may be checked against a deceased database to determine whether the entity has been deceased for more than one or two years, which may be another indicator of fraud.

Example implementations of the disclosed technology can utilize special-purpose computing systems and custom query language(s) in the processes described herein to provide meaningful results, as may be necessitated due to the sheer amount of data that needs to be tracked and analyzed.

Certain example implementations of the disclosed technology provide tangible improvements in computer processing speeds, memory utilization, and/or programming languages. Such improvements provide certain technical contributions that can enable the detection of relationships among individuals. In certain example implementations, the improved computer systems disclosed herein may enable analysis of an entire population, such as all known persons in the United States, together with associated activities. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective relationship-linking. As disclosed herein, the special-purpose computers and special-purpose programming language(s) disclosed herein can provide improved computer speed and/or memory utilization that provide an improvement in computing technology, thereby enabling the disclosed inventions.

Certain example implementations of the disclosed technology may be enabled by the use of a special purpose HPCC systems in combination with a special purpose software linking technology called Scalable Automated Linking Technology (SALT). SALT and HPCC, are developed and offered by LexisNexis Risk Solutions, Inc., the assignee of the disclosed technology. HPCC Systems, for example, provide data-intensive supercomputing platform(s) designed for solving big data problems. As an alternative to Hadoop, the HPCC Platform offers a consistent, single architecture for efficient processing. The SALT modules, in conjunction with the HPCC Systems, provides technical improvements in computer processing that enable the disclosed technology and provides useful, tangible results that may have previously been unattainable. For example, certain example implementation of the disclosed technology may process massive data sets, which are computationally intensive, requiring special software and hardware.

One of the issues that has plagued previous "relationship determination" solutions involving massive data sets is the extremely long run-times and large amount of memory/disk space required. One of the technical solutions provided by the technology disclosed herein concerns the enablement and efficiency improvement of computer systems and software to process relationship data, and to provide the desired data in a reasonable amount of time. Certain example implementations of the disclosed technology may be utilized to increase the efficiency of detection of identity-based fraud indicators.

Determining relationships among records, for example, can follow the classical n-squared process for both time and disk space. According to an example implementation of the disclosed technology, SALT provides a process in which light-weight self-joins may be utilized, for example, in generating embeddable common lisp (ECL). But disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition SALT provides a general data ingest application which allows input files to be combined or merged with an existing base file. SALT may be used to generate a parsing and classification engine for unstructured data which can be used for data preparation. The data preparation steps are usually followed by the actual record linking or clustering process. SALT provides applications for several different types of record linking including internal, external, and remote.

Data profiling, data hygiene and data source consistency checking, while key components of the record linking process, have their own value within the data integration process and may be supported by SALT for leverage even when record linking is not a necessary part of a particular data work unit. SALT uses advanced concepts such as term specificity to determine the relevance/weight of a particular field in the scope of the linking process, and a mathematical model based on the input data, rather than the need for hand coded user rules, which may be key to the overall efficiency of the method.

SALT may be used to prevent fraud by verifying identities, addresses and other factors, and using information on relationships to see where collusive activities might exist within property and casualty insurance, health care fraud, mortgage fraud and other financial services transactions.

In accordance with an example implementation of the disclosed technology, and as discussed above, a persistent data structure may be utilized as part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in-place, but instead may yield a new updated structure. Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Certain embodiments of the disclosed technology may enable the detection of possible, probable, and/or actual identity theft-related fraud, for example, as associated with a request for credit, payment, or a benefit. Certain example implementations provide for disambiguating input information and determining a likelihood of fraud. In certain example implementations, the input information may be received from a requesting entity in relation to a request for credit, payment, or benefit. In certain example implementations, the input information may be received from a requesting entity in relation to a request for an activity from a governmental agency. In certain example implementations, the entity may be a natural person. In other example implementations, the entity may represented as a natural person, but may actually be associated with a synthetic identity.

In accordance with an example implementation of the disclosed technology, input information associated with a requesting entity may be processed, weighted, scored, etc., for example, to disambiguate the information. Certain implementations, for example, may utilize one or more input data fields to verify or correct other input data fields.

In certain example implementations, data may be received from a first information source that is associated with the entity. For example, an entity may submit an application for certain benefits, services, credit, etc., and the application may contain certain identifying information received from the entity, such as name, social security number, address, etc. This "application information" may be considered as coming from the first information source, either directly from the entity, or via a vendor, business, governmental agency, etc. According to an example implementation of the disclosed technology, independent data from a second information source may be received to check or verify the entity supplied data that is received from the first information source. In certain example implementations, the independent information from the second source is not provided by the entity. However, in certain example implementation, all or a part of the entity-supplied information (such as received from the first information source) may be at least partially utilized in the generation of the independent information.

In an exemplary embodiment, a request for an activity may be received by the system. For example, the request may be for a tax refund. In one example embodiment, the request may include a requesting person's name, street address, and social security number (SSN), where the SSN has a typographical error (intentional or unintentional). In this example, one or more public or private databases may be searched to find reference records matching the input information. But since the input SSN is wrong, a reference record may be returned matching the name and street address, but with a different associated SSN. According to certain example implementations, the input information may be flagged, weighted, scored, and/or corrected based on one or more factors or metrics, including but not limited to: fields in the reference record(s) having field values that identically match, partially match, mismatch, etc, the corresponding field values.

Example embodiments of the disclosed technology may reduce false positives and increase the probability of identifying and stopping fraud based on a customized identity theft-based fraud score. According to an example implementation of the disclosed technology, a model may be utilized to process identity-related input information against reference information (for example, as obtained from one or more public or private databases) to determine whether the input identity being presented corresponds to a real identity, the correct identity, and/or a possibly fraudulent identity.

Certain example implementations of the disclosed technology may determine or estimate a probability of identity theft-based fraud based upon a set of parameters. In an example implementation, the parameters may be utilized to examine the input data, such as name, address and social security number, for example, to determine if such data corresponds to a real identity. In an example implementation, the input data may be compared with the reference data, for example, to determine field value matches, mismatches, weighting, etc. In certain example implementations of the disclosed technology, the input data (or associated entity record) may be scored to indicate the probability that it corresponds to a real identity.

In some cases, a model may be utilized to score the input identity elements, for example, to look for imperfections in the input data. For example, if the input data is scored to have a sufficiently high probability that it corresponds to a real identity, even though there may be certain imperfections in the input or reference data, once these imperfections are found, the process may disambiguate the data. For example, in one implementation, the disambiguation may be utilized to determine how many other identities are associated with the input SSN. According to an example implementation, a control for relatives may be utilized to minimize the number of similar records, for example, as may be due to Jr. and Sr. designations.

In an example implementation, the container data may be utilized to derive a date-of-birth, for example, based on matching reference records. In one example implementation, the derived date-of-birth may be compared with the issue date of the SSN. If the dates of the SSN are before the DOB, then the flag may be appended for this record as indication of fraud.

Another indication of fraud that may be determined, according to an example implementation, includes whether the entity has previously been associated with a different SSN. In an example implementation, a "most accurate" SSN for the entity may be checked to determine whether the entity is a prisoner, and if so the record may be flagged. In an example implementation, the input data may be checked against a deceased database to determine whether the entity has been deceased for more than one or two years, which may be another indicator of fraud.

Scoring:

In accordance with certain example embodiments of the disclosed technology, a score may be produced to represent how closely input data matches with the reference data. As discussed above, the input data may correspond to the entity supplied information associated with a request for a benefit or payment. The reference data, according to an example implementation, may be one or more records, each record including one or more fields having field values, and derived from one or more public or private databases. In certain example implementations, the reference data may be the best data available, in that it may represent the most accurate data in the databases. For example, the reference data may have been cross verified among various databases, and the various records and/or fields may be scored with a validity score to indicate the degree of validity.

In certain example implementations of the disclosed technology, the scores that represent how closely input data matches with the reference data scores may range from 0 to 100, with 0 being worst and 100 being best. In other example implementations, a score of 255 may indicate a null value for the score, for example, to indicate that it is not a valid score and should not be read as indicating anything about the goodness of the match.

According to an example implementation, two types of scores may be utilized: hard scores and fuzzy scores, as known by those of skill in the art. Fuzzy scores, for example are dependent on multiple factors and the same score may mean different things.

In accordance with an example implementation, certain scores may be common across all types of verification scores. For example a "0" may represent a very poor match, or a total mismatch, while a "100" may represent a perfect match. According to an example implementation a "255" may indicate a null (or invalid) comparison. In some cases such a null designation may be due to missing data, either in the input data or in the reference data.

For example, a null in the address score may indicate certain types of invalid addresses or missing information, while a "100" may represent a perfect match across primary and secondary address elements. In certain example implementations of the disclosed technology, a score in the range of "1-90" may be representative of a fuzzy range of scores that mean primary elements of the address disagree in ways ranging from serious to minor. Higher scores are better, with 80 or higher generally considered a "good match," and lower scores increasingly less similar, and with "0" representing a total miss.

According to an example implementation other scores may be dependent on the type of matching being done. For example, with regard to the phone number, a "255" may represent a blank input phone number, a blank reference phone number, or both being blank. In an example implementation, a "100" may indicate that the last 7 digits of the input and reference phone numbers are an exact match, while a "0" may represent any other condition.

With regard to the SSN, and according to an example implementation a "255" may represent a blank input SSN, a blank reference SSN, or both being blank: one side or the other is blank. In an example implementation, if neither of the SSNs (input or reference) are blank, then a computed score may be determined as 100 minus a 'similarity score'. For example, the computed scored may result in a perfect match of "100" if 'similarity score' is 0, and generally speaking, a very close match may result in a computed score of 80 or 90, while a 70 may be considered a possible match.

According to an example implementation, an entity's date of birth (DOB) may be scored by comparing the input data with reference data. In one example implementation, the standard format for dates may be represented by a year, month, day format (yyyymmdd). In certain example implementations of the disclosed technology, null values may be referenced or identified by scores of 00 or 01. In an example implementation, a "255" may represent invalid or missing DOB data in the input data, the reference data, or both while a "100" may represent a perfect yyyymmdd match. According to an example implementation, "80" may represent that yyyymm are the same and the day data (dd) is null in the input data, the reference data, or both. According to an example implementation, "60" may represent that yyyymm are the same, but the days are different in the input an reference data, but not null. According to an example implementation, "40" may represent that yyyy are the same, but mmdd in the input data, the reference data, or both is null. According to an example implementation "20" may represent that yyyy are the same, but the in the input data the reference data differ by month and day. Finally a "0" score may represent that there is no match between in the input DOB data and the reference DOB data.

With regard to the name, a "255" may represent a blank input name, a blank reference name, or both being blank, or no first, middle, or last name. Otherwise the score may be computed similarly to SSN. For example, a name match algorithm may be applied to the input and reference names, and the various qualities of matches may range from a perfect match (with a verify score of 100) to a poor match (with a verify score of 50) to no match (with a score of 0).

Scoring Examples

In accordance with an example implementation, a name scoring may be utilized to determine how close the input names (first, middle and last) match to the reference name.

| Input Name | Best Name | Score |
|---|---|---|
| 'RICHARD L TAYLOR', | 'RICHARD L TAYLOR' | 100 |
| 'RICH L TAYLOR', | 'RICHARD L TAYLOR' | 90 |
| 'RICH TAYLOR', | 'RICHARD L TAYLOR' | 80 |
| 'ROD L TAYLOR', | 'RICHARD L TAYLOR' | 0, (believed to be another person). |

In an example implementation, the SSN score may be used to determine how similar the input SSN is to the reference SSN.

| Input SSN | Reference SSN | Score |
|---|---|---|
| 'ABCDEFGHI', | 'ABCDEFGHI', | 100 |
| 'ABCDEFGHZ', | 'ABCDEFGHI', | 90 |
| 'ABCDEFGZZ', | 'ABCDEFGHI', | 80 |
| 'ABCDEFZZZ', | ABCDEFGHI', | 70 |
| 'ABCDEZZZZ', | 'ABCDEFGHI', | 60 |
| 'ABCDZZZZZ', | 'ABCDEFGHI', | 40 |
| 'ZZZZZFGHI', | 'ABCDEFGHI', | 40 |

Certain embodiments of the disclosed technology may enable the detection of possible, probable, and/or actual fraud associated with a request for a payment or a benefit to a governmental agency. Embodiments disclosed herein may provide systems and methods for detecting identity misrepresentation, identity creation or identity usurpation related to the request. According to an example implementation of the disclosed technology, information supplied by a requester, together with information obtained from other sources, such as public or private databases, may be utilized to determine if the request is likely to be fraudulent or legitimate.

Certain embodiments of the disclosed technology may enable detection of various requests for payment, benefit, service, refund, etc. from a government agency or entity. The government agency, as referred to herein, may include any government entity or jurisdiction, including but not limited to federal, state, district, county, city, etc. Embodiments of the disclosed technology may be utilized to detect fraud associated with non-government entities. For example, embodiments of the disclosed technology may be utilized by various businesses, corporations, non-profits, etc., to detect fraud.

In one example application of the disclosed technology, suspect or fraudulent tax returns refund requests may be detected. For example, the disclosed technology may utilize information supplied by the refundee together with information obtained from other sources, such as public or private databases, to determine if the refund request is likely to be fraudulent or legitimate. Various exemplary embodiments of the disclosed technology will now be described with reference to the accompanying figures.

FIG. 1 shows a block diagram illustrating various scenarios associated with a request for payment or benefit, according to exemplary embodiments of the disclosed technology. In one example scenario, a legitimate requester 102 may submit request for payment or benefit to a governmental entity 108. In another example implementation, the request may be submitted to a private or public entity, such as a company 110. The request, in one example implementation, may be in the form of a tax return to the governmental entity 108, for example, the Internal Revenue Service (IRS) or a State Revenue Department.

In one example implementation, the legitimate requester 102 may have a legitimate social security number 104 associated with their name. In certain exemplary embodiments, the legitimate requester 102 may also have a legitimate address 106 associated with their name and/or social security number 104. According to certain exemplary embodiments, one or more databases 138 may be utilized, for example, to verify that the name, social security number 104, and/or address 106 match the identity of the legitimate requester 102. In a typical normal scenario, the legitimate requester 102 may submit the request for payment or benefit, and governmental entity 108 may provide the payment or benefit 112. For example, the payment or benefit, in one example implementation may be a tax refund. Accordingly, in certain example implementation, the payment or benefit 112 may be dispersed to the legitimate requester 102 by one or more of: (1) a check mailed to the legitimate address 106; (2) a debit card 116 mailed to the legitimate address 106; or (3) electronic funds transferred 113 to the legitimate taxpayer's 102 bank account 114. In other example implementations, the payment or benefit 112 may dispersed or provided according to the normal procedures of the providing entity. In such a scenario, the system 100 may work quickly and efficiently to provide payment or service (for example a refund tax overpayment) to the legitimate requester 102.

Unfortunately, there exists other scenarios, as depicted in FIG. 1, where a fraudster 124 may apply for payment or benefit 112 using misrepresented or stolen identity information. In one exemplary scenario, the fraudster 124 may apply for payment or benefit 112 using a social security number 120 and name associated with a deceased person 118. In certain scenarios, the fraudster 124 may open a bank account 114 in the name of the deceased person 118 and request the payment or benefit 112 in the form of an electronic deposit 113. In another scenario, the fraudster 124 may request the payment or benefit 112 in the form of a debit card. Each of these scenarios may result in the fraudster 124 obtaining the payment or benefit 112 without having to present positive identification, for example, as is typically needed to cash a check.

In certain scenarios, the fraudster 124 may actually reside at a first address 132, or even in jail 130, but may submit a request for payment or benefit using a second address 128 to avoid being tracked down. In certain scenarios, the fraudster 124 may provide a fabricated social security number 126 in requesting the payment or benefit. In yet another scenario, the fraudster 126 may steal the real social security number 136 associated with a child 134 to obtain payment or benefit.

Exemplary embodiments of the disclosed technology may be utilized to detect a potential fraudulent requests for payment or benefits, and may be utilized to cancel a payment or benefit to a potential fraudster 124. Other exemplary embodiments of the disclosed technology may be utilized to detect false positive situations and allow payment or benefit for scenarios that may otherwise be flagged as being suspicious. For example, a legitimate scenario that can appear as fraudulent involves taxable income from a first job. Typically, such taxpayers in this category may be minors with no public record associated with a residence or prior income. Embodiments of the disclosed technology may utilize social security number patterns, blocks, etc., and/or the age of the requester 102 124 to determine legitimacy of the request and/or the legitimacy of the requester's identity.

According to certain exemplary embodiments of the disclosed technology, a requester 102 124 may provide certain entity-supplied information with a request for payment or benefit 112 that includes at least a name, social security number, and mailing address. In an exemplary embodiment, one or more databases 138 may be queried with the entity-supplied information. For example, the one or more databases 138 may include public or private databases. In accordance with certain exemplary embodiments, one or more public records may be utilized verify entity-supplied information or retrieve additional information based on the entity-supplied information. According to exemplary embodiments, the public records may include one or more of housing records, vehicular records, marriage records, divorce records, hospital records, death records, court records, property records, incarceration records, or utility records. In exemplary embodiments, the utility records can include one or more of utility hookups, disconnects, and associated service addresses.

According to exemplary embodiments, a plurality of independent information may be received in response to the querying of the public or private database(s). In accordance with exemplary embodiments, the independent information may include, but is not limited to (1) an indication of whether or not the entity is deceased; (2) independent address information associated with the entity; (3) address validity information associated with the entity-supplied information; (3) one or more public records associated with the entity-supplied information; or (4) no information.

Exemplary embodiments of the disclosed technology may make a comparison of the entity-supplied information with the plurality of independent information to determine zero or more indicators of fraud. For example, embodiments of the disclosed technology may compare the entity-supplied information with the plurality of independent information to determine if the entity associated with the request for payment or benefit died within a timeframe that would indicate a possible non-fraud request, but with no record of association between the entity-supplied mailing address and the address information obtained via the independent information. Such a scenario may represent a situation where a fraudster 124 has obtained a name and social security information 120 from a deceased person 118, but where the address provided does not correspond with the known residence address 122 of the deceased person 118, or with any known relatives or associates of the deceased person 118. This scenario may be an indicator of a attempt by a fraudster 124 to have a deceased person's 118 payment or benefit 112 sent to a post office box or other address that can be monitored by the fraudster 124 without any direct tie to the fraudster 124. Exemplary embodiments of the disclosed technology may include a length of time entity has been deceased (if the entity is deceased) in the determination of fraud indicators. For example, a request for payment or benefit listing a person known to be dead for 10 years is very likely a fraudulent refund request.

According to another exemplary embodiment of the disclosed technology, a comparison may be made with the entity-supplied mailing address and the independent information to determine if the entity-supplied mailing address is invalid with no record of association between a zip code of the entity-supplied mailing address and one or more zip codes associated with the independent address information. For example, situations exist where a legitimate taxpayer 102 may abbreviate or include a typographical error their return mailing address, but they may provide a correct zip code that could be verified with the independent information. However, a fraudster 124 may be likely to use a completely different zip code, and in such situations, embodiments of the disclosed technology may utilize the inconsistent zip code information to flag a possible fraudulent tax return request.

According to another exemplary embodiment of the disclosed technology, a comparison may be made with the entity-supplied mailing address and the independent information to determine whether or not there is any record of association between the entity-supplied mailing address and any independent address information, such as the address of a relative, or associate. According to an exemplary embodiment, if there is no association between the entity-supplied mailing address and any independent address information, then there is a high likelihood that the payment or benefit request is fraudulent.

In accordance with certain exemplary embodiments of the disclosed technology, fraud false positive indicators may determined, based at least in part on a comparison of the entity-supplied information with the plurality of independent information. Absent of exemplary embodiments of the disclosed technology, certain situations may be incorrectly flagged as fraudulent, and may create costly and unnecessary delays related to the disbursement of the payment or benefit. In one exemplary embodiment, a fraud false positive indicator may be based on an analysis to detect if the entity-supplied mailing address is invalid, but with a record of association between a zip code of the entity-supplied mailing address and one or more zip codes associated with the independent address information. This represents a situation where a legitimate requester 102 has abbreviated their address or included a typographical error in the address, but the zip code corresponds with one known to be associated with the legitimate requester 102.

According to another exemplary embodiment, a fraud false positive indicator may be based on the entity-supplied social security number when there is no independent information available. For example, in one exemplary embodiment, the entity-supplied social security number may be checked to determine if it is valid and issued within 3 to 15 years, and the independent information can be checked to see if it includes information. If no independent information is available and if the entity-supplied social security number is valid and issued within 3 to 15 years, then this information may provide an indication that the requesting entity is a minor. In another exemplary embodiment, the social security number may be checked to determine if the entity is at least 24 years old with a valid social security number issued within 3 to 15 years, and the obtained independent information includes no information. In this scenario, exemplary embodiments of the disclosed technology may provide an indication that the requesting entity is an immigrant.

According to exemplary embodiments of the disclosed technology, one or more public or private databases 138 may be accessed to receive independent information. For example, one or more public records may be provide housing records, vehicular records, marriage records, divorce records, hospital records, death records, court records, property records, incarceration records, or utility records. In exemplary embodiments, the utility records may include one or more of utility hookups, disconnects, and associated service addresses. According to exemplary embodiments of the disclosed technology, such public records may be searched by social security number and/or name to provide independent information that can be utilized to verify entity-supplied information. For example, entity-supplied address information can be checked to determine if it corresponds to any addresses of relatives or associates of the entity.

According to certain exemplary embodiments of the disclosed technology, fraud associated with a request for payment or benefit may be detected by querying a Do Not Pay list with a combination of entity-supplied information and independent information obtained from one or more public records. For example, a person may be listed on a Do Not Pay list for a number of reasons, including being incarcerated, not paying child support, having liens, etc. Persons on the Do Not Pay list may supply an incorrect social security number or a slight misspelling of a name to avoid being matched with the information on the Do Not Pay list.

An example implementation of the disclosed technology may include receiving entity-supplied information that includes at least a name and a social security number and querying one or more public records with the entity-supplied information. Certain exemplary embodiments of the disclosed technology may receive, based at least on the querying, public data that includes one or more of a second social security number or variant of a social security number associated with entity-supplied name, a second name associated with the entity-supplied social security number, or a name variant associated with the entity-supplied social security number. For example, a variant may include information such as a name, a number, or an address, etc. that approximately matches real or legitimate information. A social security number variant, for example, may be nearly identical to a legitimate social security number, but with one or more numbers changed, transposed, etc.

According to exemplary embodiments of the disclosed technology, a Do Not Pay list may be queried with one or more combinations and/or variants of the entity-supplied information and the received public data, and a fraud alert may be output if the one or more combinations and/or variants result in a match with at least one record in the Do Not Pay list. Thus, in certain example implementations, the entity-supplied information may be compared with variations of information on the Do Not Pay list (and/or other public or private information) to determine a possible match. Conversely, in other example implementations, information obtained from the Do Not Pay list (and/or other public or private sources) may be compared with variations of the entity-supplied information to determine possible matches.

According to certain exemplary embodiments, the Do Not Pay list may be queried with one or more combinations of the entity-supplied name and entity-supplied social security number, the entity-supplied name and a second social security number or a variant of the social security number, the second name or name variant and the entity supplied social security number, or the second name or name variant and the second social security number or variant of the social security number. According to exemplary embodiments, if one of the combinations or variants matches the information on the Do Not Pay list, then a fraud alert may be output.

Figure 2:
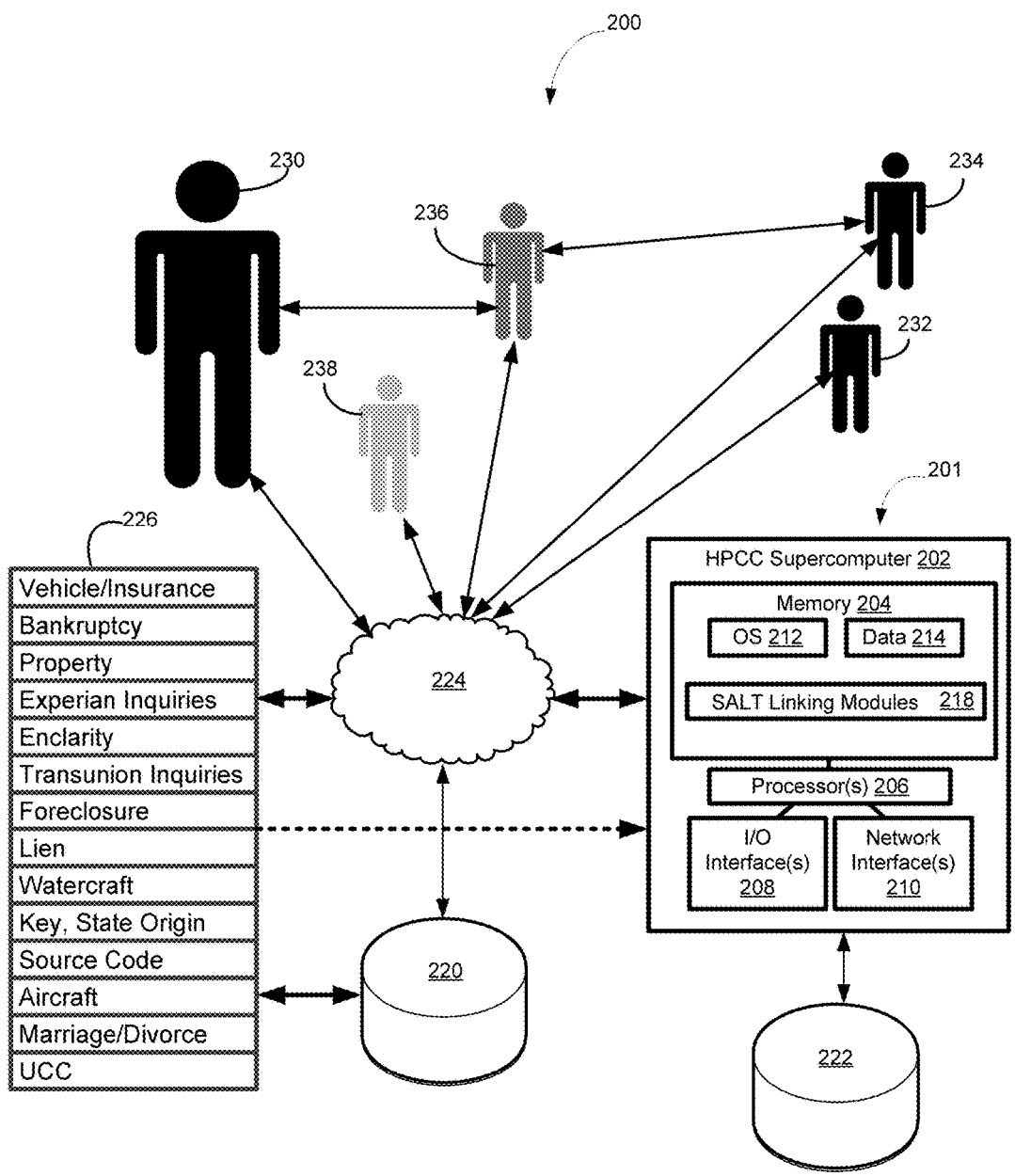
FIG. 2 is a block diagram 200 of an illustrative process for linking information from various data sources, according to an exemplary embodiment of the disclosed technology.

FIG. 2 is a block diagram 200 of an illustrative relationship-linking example and system 201 for determining relationship links between/among individuals. Certain example implementations of the disclosed technology are enabled by the use of a special-purpose HPCC supercomputer 202 and SALT 218, as described above, and as provided with further examples in the APPENDIX.

According to an example implementation of the disclosed technology, the system 201 may include a special-purpose supercomputer 202 (for example HPCC) that may be in communication with one or more data sources and may be configured to process records 226 obtained from the various data sources 220 222. According to an exemplary embodiment of the invention, the computer 202 may include a memory 204, one or more processors 206, one or more input/output interface(s) 208, and one or more network interface(s) 210. In accordance with an exemplary embodiment the memory 204 may include an operating system 212 and data 214. In certain example implementations, one or more record linking modules, such SALT 218 may be provided, for example, to instruct the one or more processors 206 for analyzing relationships within and among the records 226. Certain example implementations of the disclosed technology may further include one or more internal and/or external databases or sources 220 222 in communication with the computer 202. In certain example implementations, the records 226 may be provided by a source 220 222 in communication with the computer 202 directly and/or via a network 224 such as the Internet.

According to an example implementation of the disclosed technology, the various records 226 of a population may be processed to determine relationships and/or connections with a target individual 230. In accordance with an example implementation of the disclosed technology, the analysis may yield other individuals 232 234 236 238 . . . that are directly or indirectly associated with the target individual 230. In certain example implementations, such relationships may include one or more of: one-way relationships, two-way relationships, first degree connections, second degree connections etc., depending on the number of intervening connections.

The example block diagram 200 and system 201 shown in FIG. 2 depicts a first individual 236 that is directly associated with the target individual 230 by a first-degree connection, such as may be the case for a spouse, sibling, known business associate, etc. Also shown, for example purposes, is a second individual 234 who is associated with the target individual 230 via a second degree connection, and who also is connected directly with the first individual 236 by a first degree connections. According to an exemplary embodiment, this type of relationship would tend to add more weight, verification, credibility, strength etc., to the connections. Put another way, such a relationship may strengthen the associated connection so that it may be considered to be a connection having a degree less that one, where the strength of the connection may be inversely related to the degree of the connection.

Various embodiments of the communication systems and methods herein may be embodied in non-transitory computer readable media for execution by a processor. An exemplary embodiment may be used in an application of a mobile computing device, such as a smartphone or tablet, but other computing devices may also be used.

Figure 3:
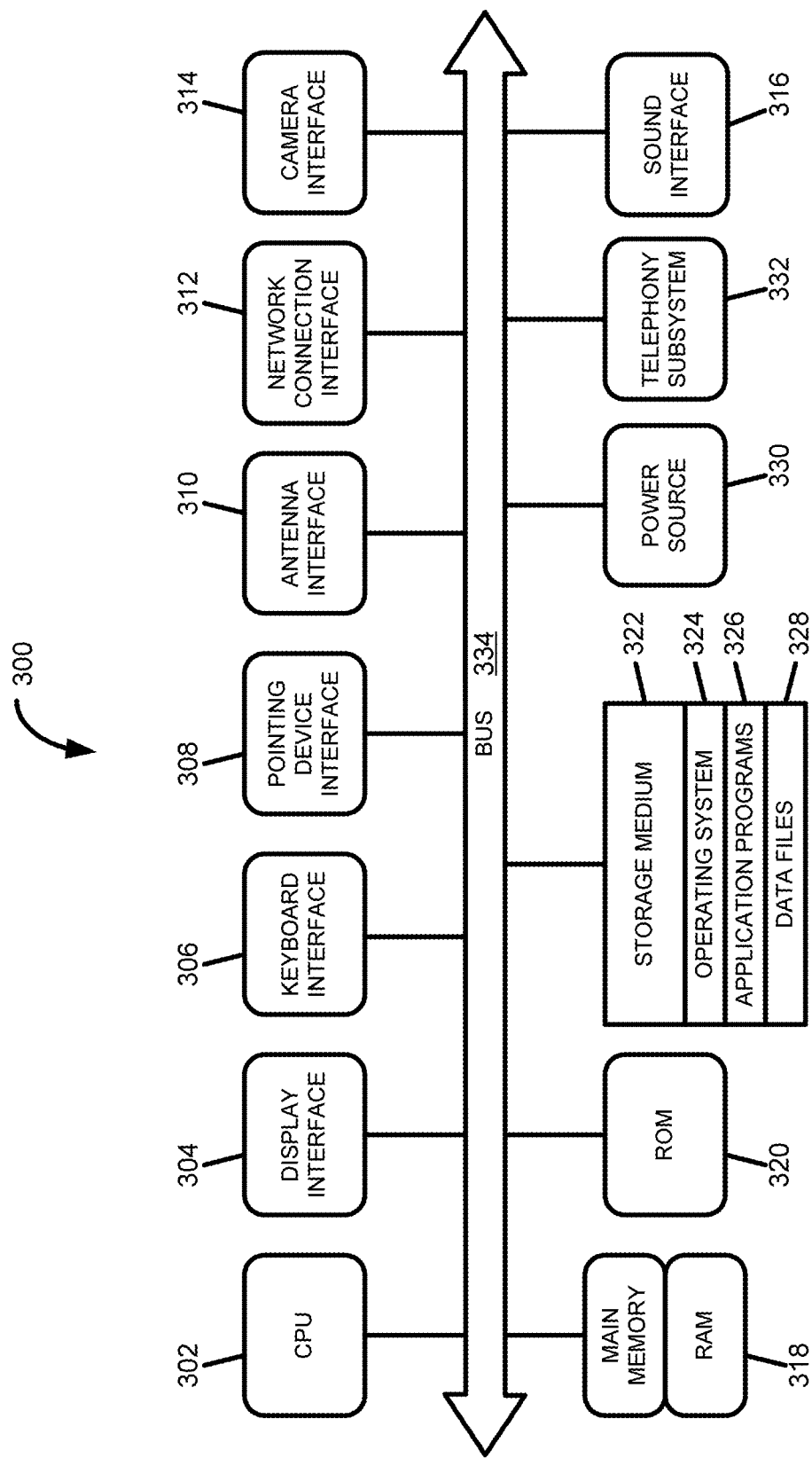
FIG. 3 is a block diagram of an illustrative fraud detection system 300 according to an exemplary embodiment of the disclosed technology.

FIG. 3 depicts a block diagram of an illustrative computer system 300 and/r supercomputer system architecture according to an exemplary embodiment of the disclosed technology. Certain aspects of FIG. 3 may also be embodied in the supercomputer 202, as shown in FIG. 2. Various embodiments of the communication systems and methods herein may be embodied in non-transitory computer readable media for execution by a processor. It will be understood that the architecture illustrated in FIG. 3 is provided for exemplary purposes only and does not limit the scope of the various embodiments of the communication systems and methods. In certain example implementations, the computing device or system 300 may be a specialized HPCC Systems, as developed and offered by LexisNexis Risk Solutions, Inc., the assignee of the disclosed technology. HPCC Systems, for example, provide data-intensive supercomputing platform(s) designed for solving big data problems. Various implementations and methods herein may be embodied in non-transitory computer readable media for execution by a processor.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or touch screen. Exemplary embodiments of the system 300 may include an antenna interface 310 that provides a communication interface to an antenna; a network connection interface 312 that provides a communication interface to a network. In certain embodiments, a camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to exemplary embodiments, a random access memory (RAM) 318 is provided, where computer instructions and data are stored in a volatile memory device for processing by the CPU 302.

According to an exemplary embodiment, the architecture 300 includes a read-only memory (ROM) 320 where invariant low-level systems code or data for basic system functions such as basic input and output (I/O), startup, or reception of keystrokes from a keyboard are stored in a non-volatile memory device. According to an exemplary embodiment, the system 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, Knowledge Engineering Language, SALT, a web browser application, a widget or gadget engine, and or other applications, as necessary) and data files 328 are stored. According to an exemplary embodiment, the architecture 300 includes a power source 330 that provides an appropriate alternating current (AC) or direct current (DC) to power components. According to an exemplary embodiment, the system 300 includes and a telephony subsystem 332 that allows the device 300 to transmit and receive sound over a telephone network. The constituent devices and the CPU 302 communicate with each other over a bus 334.

In accordance with exemplary embodiments, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one exemplary configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the system 300 or to upload data onto the system 300. A computer program product, such as one utilizing a communication system may be tangibly embodied in storage medium 322, which may comprise a machine-readable storage medium.

In accordance with an example implementation of the disclosed technology, the special-purpose hardware and instruction set may enable processing of a massive number of records to detect indicators of fraudulent activity. In some instances, the number of records when the initial data build is assembled, can approach or exceed 3 billion records in number. In accordance with an example implementation of the disclosed technology, these records may be processed by SALT to produce a relative build that can result in even more records and relationships. For example, in some instances, the number of records in the relative build can approach or exceed 30 billion records in number.

In accordance with an example implementation of the disclosed technology, the relative build records may be post-processed to provide a reduced set of records (for example approximately 14 billion records). This reduction in the number of records can be a result of eliminating duplicates, scrubbing data, correcting data errors, removing records having low accuracy or linkage confidence etc. In certain example implementations, the reduced set of records can include relationship type, relationship history, linkages among individual IDs, etc. In accordance with an example implementation, relationship linking may be calculated via graph analytics with the Knowledge Engineering Language (KEL) and/or SALT, as previously discussed, which may provide certain speed, efficiency, and/or memory utilization advantages over previous computation languages.

Certain example implementations of the disclosed technology may enable identification of errors in data. For example, data provided by information vendors can include errors that, if left undetected, could produce erroneous results. Certain example implementations of the disclosed technology may be used to measure the accuracy and/or quality of the available data, for example by cross-checking, so that the data be included, scrubbed, corrected, or rejected before utilizing such data in the full analysis. In accordance with an example embodiment of the disclosed technology, such data quality may be determined and/or improved by one or more of cross checking, scrubbing to correct errors, and scoring to use or reject the data.

In accordance with an example implementation of the disclosed technology, connections and degrees of separation between entities may be utilized. For example, the connections may include a list of names of known or derived business associates, friends, relatives, etc. The degrees of separation may be an indication of the strength of the connection. For example, two people having a shared residence may result in a connection with a degree of 1. In another example implementation, two people working for the same company may have a degree of 2. In one example implementation, the degree of separation may be inversely proportional to the strength of the connection. In other example embodiments, different factors may be contribute to the degree value, and other values besides integers may be utilized to represent the connection strength.

Figure 4:
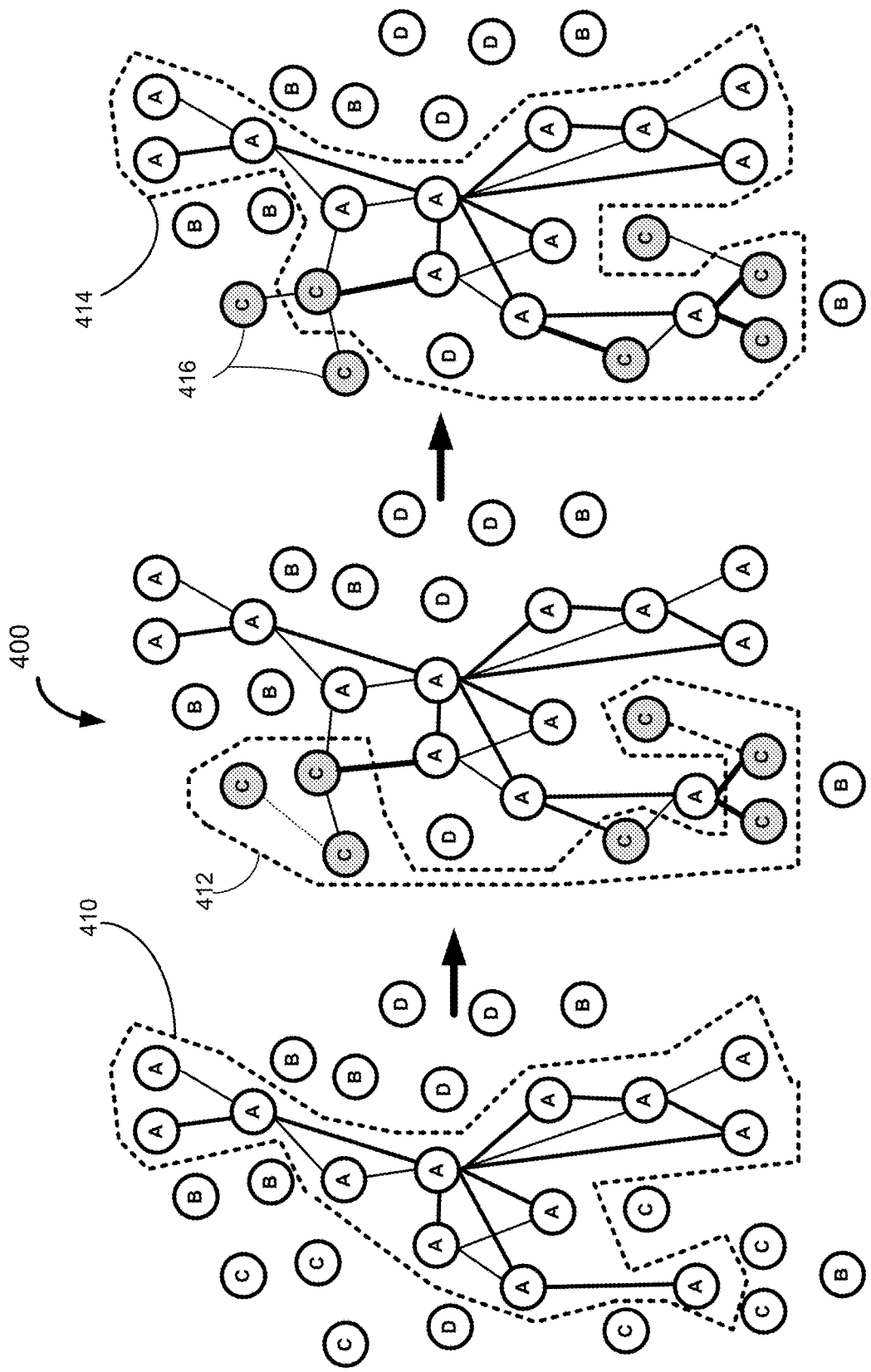
FIG. 4 is an illustrative example process 400 for clustering certain entity data, according to an exemplary embodiment of the disclosed technology.

FIG. 4 is a graphical example of a clustering and co-convergence process, according to an example implementation of the disclosed technology. The circles shown in FIG. 4 may depict available database record representations corresponding to two or more different attributes or aspects (A, B, C, D . . . ). Such records may be in a single record set, or they may be received or otherwise derived from two or more record sets or sources. Such database record representations may be processed to determine linkages or relationships among the records and/or entities. The "relationships" among the various records (nodes) may be represented (for illustration purposes) as connecting lines (edges), with line weights representing different types of relationships and/or weightings among field values of the database records.

In certain example embodiments, each of the record data representations (circles or nodes) may include or represent multiple fields (not shown in FIG. 4), and may therefore be represented as nodes in a hyperspace. In one example implementation, the record data representations may relate to entities, such as people, and may include fields (such as Last Name, First Name, Address, Social Security Number, etc.,) with corresponding field values (such as Smith, John, 45 Broad Street, 543-21-1111). In another example implementation, the record data representations may represent entities such as an organization, and may include fields such as corporate offices, branches, locations, products, managers, employees, etc., with corresponding field values. In other example embodiments, the record data representations may include data representations from two or more different record sets. For example, the data may include representations from one set of records that represent people (with fields such as Last Name, First Name, Address, Social Security Number, etc.,) and the data may include representations from another set of records that represent businesses (with fields such as corporate offices, branches, locations, products, etc.).

According to certain example implementations, each available record data representation may correspond to an entity representation and may include a plurality of fields, each field configured to contain a field value, and each field value assigned a field value weight corresponding to a specificity of the field value in relation to all field values in a corresponding field of the records.

In accordance with an example implementation, for any particular given record attribute, the general process of clustering records may be refined with each iteration by assuming that all the other records and relationships are correct, performing one clustering iteration, then moving on to the next record attribute, performing one clustering iteration, and so forth. For example, the record data representations may be evaluated with respect to a particular attribute and/or aspect, and a cluster of records may be identified as having certain quantitative or qualitative relationships to the particular attribute of interest.

An example of an initial cluster 410 is depicted in the left-hand side of FIG. 4 within the dotted outline to distinguish the records having similar aspects or attributes of the cluster 410 from the remaining records. The initial clustered records 410, as depicted in this example, are shown sharing a common attribute identifier: "A," along with connection weights that may represent any number of scenarios, according to certain example embodiments of the disclosed technology. For example, the "A" identifier and the connecting edges may represent certain commonalities with respect to the identifier evaluated in the clustering iteration (such as exact or partial matches of a last name).

The middle cluster in FIG. 4 depicts another cluster in which a new cluster 412 is formed having records identified with "C" attributes or aspects. The right-hand cluster in FIG. 4 represents a re-clustering iteration process, according to an example implementation of the disclosed technology, in which records are identified with both "A" and "C" attributes or aspects to form a new cluster 414 To arrive at the new cluster 414 (and not explicitly shown in FIG. 4), example embodiments may utilize a first iteration process whereby records with "A" attributes are clustered while noting relationships (edges and weights, for example) between those records having "C" attributes, and vice-versa. For example, starting with the initial cluster 410, attributes or commonalities (represented by connecting edges) may be evaluated to aggregate one or more relationships between any two entities. As depicted in 410, and based on relationships and/or other criteria among the records, the new cluster 414 formed in the re-clustering step may include certain records of the first iteration clusters 410 412 while omitting certain records 416.

In general terms, and in accordance with an example implementation, the available records may be initially clustered into a first set of clusters having corresponding first cluster identifications (IDs), and each record may include one or more field values. For example, records may be clustered according to the various identifications, such as "A," "B," "C," "D," etc., as indicated in FIG. 4. In accordance with an example implementation, and as discussed above, the initial clustering iteration(s) may be based at least in part on determining similarity among corresponding field values of database records. In an example implementation, mutually matching records may be associated by performing at least one matching iteration for each of the records, based at least in part on the cluster IDs. In an example implementation, the matching iteration may include linking related database records based at least in part on a determined match value. In another example implementation, the matching iteration may include linking related database records, based at least in part on determined mutually preferred records. In an example implementation, the clustering may include a process of determining similarity among corresponding field values of the database records.

According to an example implementation of the disclosed technology, the iteration process may include re-clustering at least a portion of the database records into a second set of clusters (for example, the cluster 414) having a corresponding second cluster ID. In an example implementation, the re-clustering may be based, at least in part, on associating mutually matching attributes of the initial clusters. In another example implementation, the re-clustering may be based, at least in part, on determining similarity among corresponding field values of the database records.

In one example implementation, the initial clustering may include associating mutually matching database records, which may include determining highest compelling linkages among the database records, which may further include identifying mutually preferred pairs of records from the database records, each mutually preferred pair of records consisting of a first record and a second record, the first record consisting of a preferred record associated with the second record and the second record consisting of a preferred record associated with the first record. In an example implementation, the mutually preferred pairs of records may be assigned a match score that meets pre-specified match criteria.

In an example implementation, the iteration process may also include assigning, for each record from the database records, at least one associated preferred record, wherein a match value assigned to a given record together with its associated preferred record is at least as great as a match value assigned to the record together with any other record in the database records. In an example implementation, the iteration process may also include forming and storing a plurality of entity representations in the database, each entity representation of the plurality of entity representations including at least one linked pair of mutually preferred records.

According to an example implementation of the disclosed technology, determining similarity among the corresponding field values of the records may include assigning a hyperspace attribute to each record. The hyperspace attribute that corresponds to two database records may correlate with a similarity of the corresponding field values of the two database records. In certain example embodiments, membership of each database record in a plurality of hyperspace clusters may be determined based at least in part on the hyperspace attributes. According to an example implementation each record may be assigned a cluster ID and a match value reflecting a likelihood that the record is a member of a particular hyperspace cluster, and related records may be linked based at least in part on the cluster ID and match value (as depicted by the edges joining the nodes in FIG. 4). Determining membership of each database record in the plurality of hyperspace clusters, for example, may include creating a plurality of nodes at random locations in hyperspace, each node maintaining records in hyperspace based on the hyperspace attribute for which it is the closest node.

In accordance with certain implementations of the disclosed technology duplicate records (for example, ones that are likely to represent the same entity) may be eliminated by merging those database records that have hyperspace attribute differences within a predefined criteria, resulting in a reduced set of database records. In accordance with an example implementation, the process may further include recalculating the field value weights for the reduced set of database records, and re-clustering the reduced set of records based at least in part on the recalculated field value weights.

According to an example implementation, of the disclosed technology, the clustering, iterating, recalculating, and re-clustering etc. may produce a set of refined clusters in which the records in a given set possess criteria that resemble the other records in the set. Such clustering may provide useful characteristics, categories, structures, etc., for understanding the interrelations among records in a database, and may further be used to define characteristics, categories, structures, etc., for new data as it becomes available.

Figure 5:
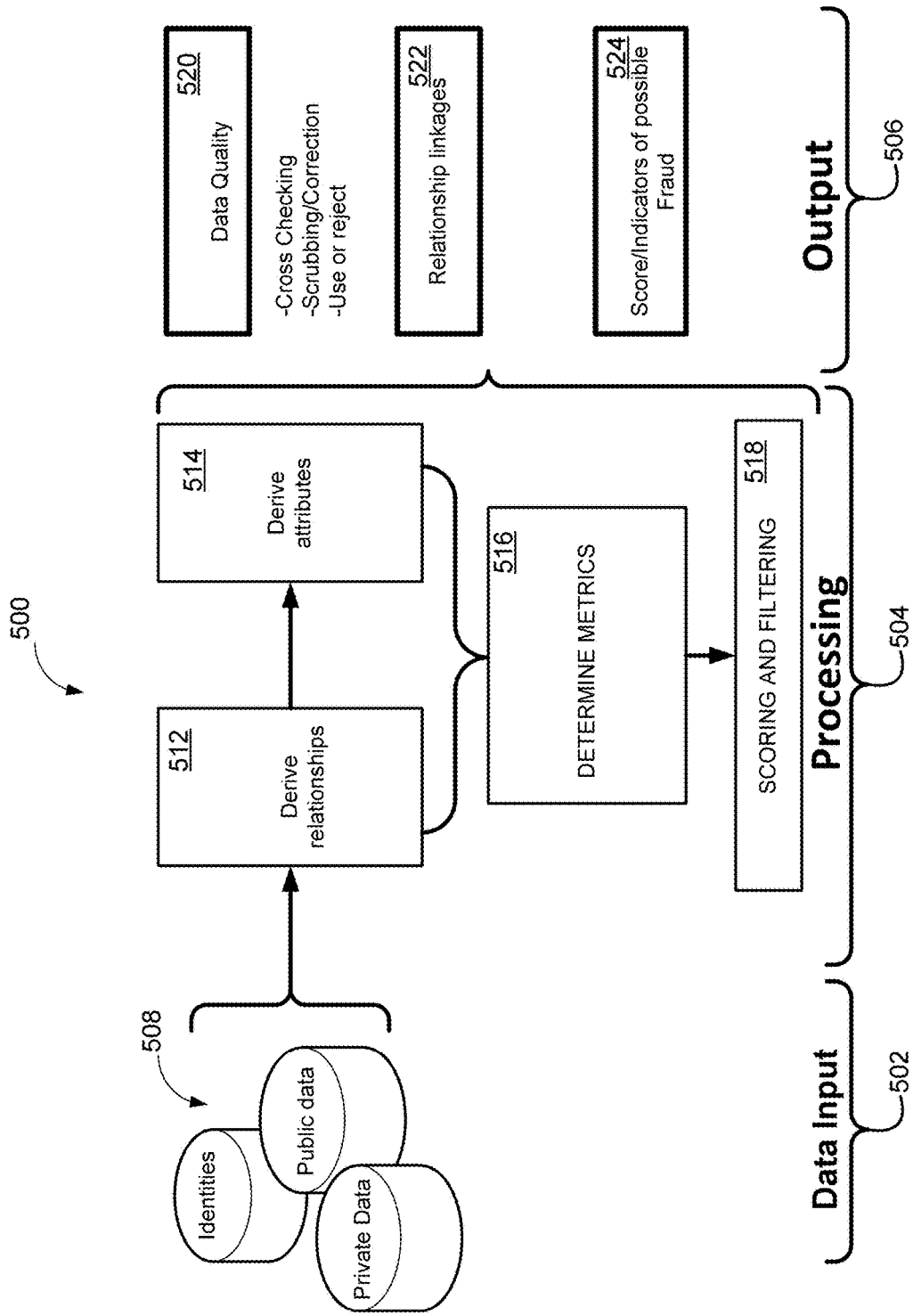
FIG. 5 is a block diagram 500 of an illustrative linking process, according to an exemplary embodiment of the disclosed technology.

FIG. 5 is a block diagram depicting a certain example implementation 500 of the disclosed technology, which may include phases, such as data input 502, processing 504, and output 506. According to an example embodiment, a plurality of data sources and types 508 may be utilized to derive relationships 512 and attributes 514 among associated records. In certain example implementations, the relationships 512 and attributes 514 may be used to determine metrics 516, and such metrics may be utilized for scoring and filtering 518 the records and associated data.

In an example implementation, the output 506 may be based on data quality 520, and may include relationship linkages 522. In certain example implementations, indicators of possible fraud 524 may be output. According to an example implementation of the disclosed technology, the indicators of possible fraud 524 may be based on additional scoring. In an example implementation, a scoring unit may utilize a predetermined scoring algorithm for scoring some or all of the data. In another example implementation, the scoring unit may utilize a dynamic scoring algorithm for scoring some or all of the data. The scoring algorithm, for example, may be based on seemingly low-risk events that tend to be associated with organizations, such as fraud organizations. The algorithm may thus also be based on research into what events tend to be indicative of fraud in the industry or application to which the system is directed.

In accordance with an example implementation of the disclosed technology, may publicly available data may be utilized as input data 508, which may include several hundred million records. Certain example implementations may clean and standardize data to reduce the possibility that matching entities are considered as distinct. Before creating a graph, certain example implementations may use this data to build a large-scale network map of the population in question with associated attributes, linkages, relationships, etc.

According to an example implementation, and as previously described, the relatively large-scale of supercomputing power and analytics may enable identifying organized collusion. Example implementation of the disclosed technology of the systems and methods disclosed herein may rely upon large scale, special-purpose, parallel-processing computing platforms to increase the agility and scale of the solutions.

Example implementations of the disclosed technology of the systems and methods disclosed herein may measure behavior, activities, and/or relationships to actively and effectively expose syndicates and rings of collusion. Unlike many conventional systems, the systems and methods disclosed herein need not be limited to activities or rings operating in a single geographic location, and it need not be limited to short time periods. The systems and methods disclosed herein may be used to determine whether activities fall within an organized ring or certain geographical location.

In one example implementation, a filter may be utilized to reduce the data set to identify groups that evidence the greatest connectedness based on the scoring algorithm. In one example implementation, systems and methods disclosed herein may utilize scores that match or exceed a predetermined set of criteria may be flagged for evaluation. In an example implementation of the disclosed technology, filtering may utilize one or more target scores, which may be selected based on the scoring algorithm. In one example implementation, geo-social networks having scores greater than or equal to a target score may be flagged as being potentially collusive.

Figure 6:
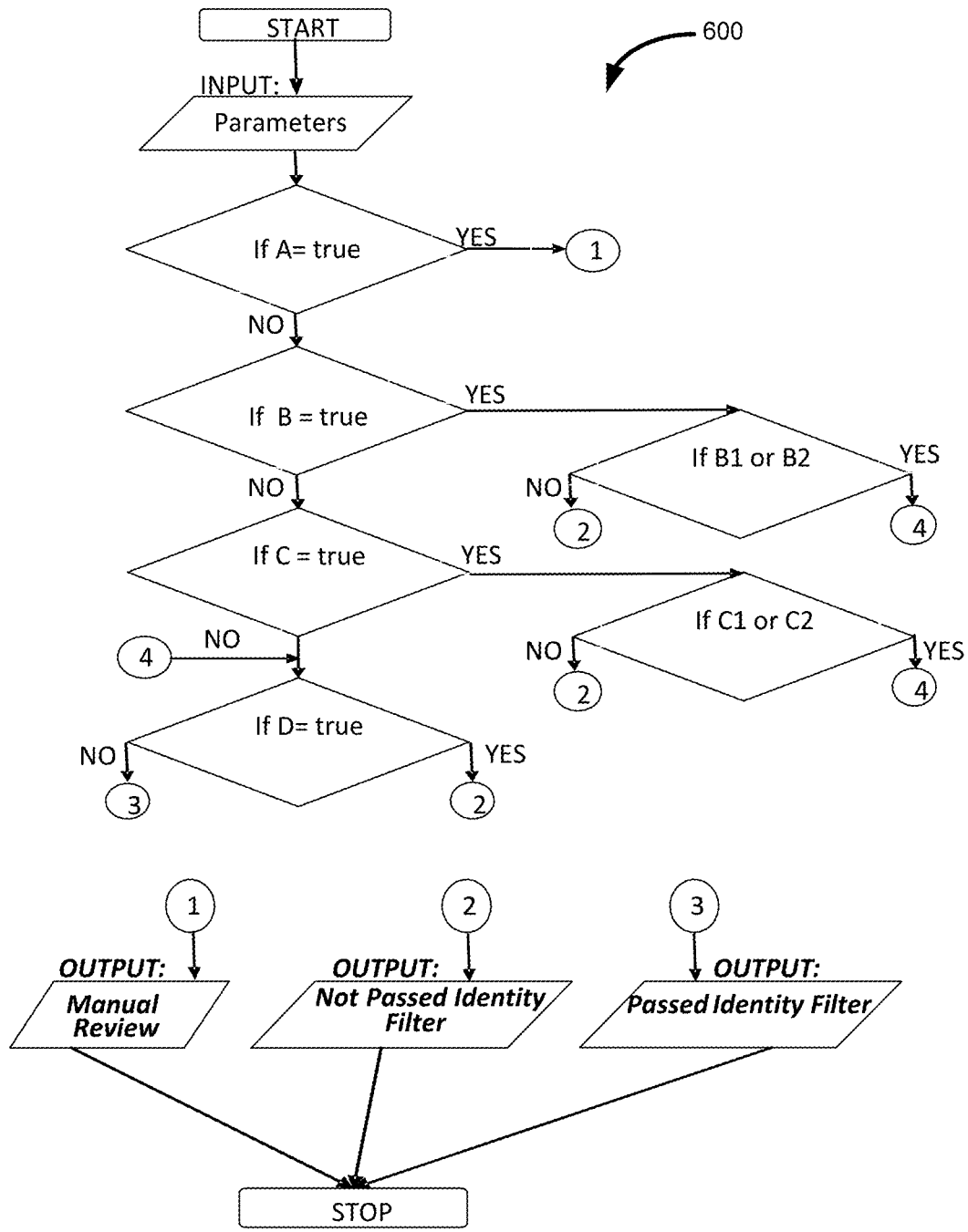
FIG. 6 is a flow diagram of a process 600 according to an exemplary embodiment of the disclosed technology.

FIG. 6 depicts a flow diagram 600, according to an example process implementation. The flow diagram 600 may be utilized to test the input data, for example, so that a determination may be made, with a computer processor, as to whether or not the identity associated with and represented by the input data passes certain tests. For example, as shown in FIG. 6, input parameters and/or attributes associated with the input data may be tested based on a number of variables, scored, and sorted in to records that pass the identity filter tests, records that do not pass the identity filter tests, and records that may require manual review.

Attribute Examples

Table 1 lists some of the attributes, descriptions, and example relative order of importance with respect to determining indicators of fraud, according to an example implementation of the disclosed technology. In accordance with certain example implementations, such attributes may be utilized for the various tests in conjunction with the flow diagram 600 as shown in FIG. 6. For example, the attribute VariationSearchAddrCount may be tested to see if it is associated with >2 addresses, and if so (and perhaps depending on other such tests with other attributes), the record may be flagged as not passing the identity filter test, and thus, may be an indicator of fraud.

TABLE 1

| Example Order of Importance | Attribute | Attribute Description |
|---|---|---|
| 1 | CorrelationSSNAddrCount | Total number of sources reporting input SSN with input address |
| 2 | AssocDistanceClosest | Distance in miles between identity and closest first-degree relative or associate |
| 3 | SearchUnverifiedAddrCountYear | Number of searches in the last year for the identity using an address that was not on the identity's file at the time of the search |
| 4 | VariationSearchAddrCount | Total number of addresses associated with the identity in searches |
| 5 | AddrChangeDistance | Distance in miles between input address and the most recent unique address |
| 6 | IDVerRiskLevel | Indicates the fraud-risk level based on how well the input components match the information found for the input identity |
| 6a | IDVerSSN | Indicates if the SSN is verified |
| 6b | IDVerName | Indicates if the identity's name is verified |
| 6c | IDVerAddress | Indicates if the input address is verified |
| 6d | IDVerPhone | Indicates if the input phone is verified |
| 7 | DivAddrSSNCount | Total number of unique SSNs currently associated with input address |

TABLE 1-continued

| Example Order of Importance | Attribute | Attribute Description |
|---|---|---|
| 8 | BankruptcyAge | Time since most recent bankruptcy filing |
| 9 | CorrelationSSNNameCount | Total number of sources reporting input SSN with input name |
| 10 | PBProfile | Profile of purchase activity |
| 11 | VariationSearchSSNCount | Total number of SSNs associated with the identity in searches |
| 12 | ValidationSSNProblems | Indicates SSN validation status - Deceased |
| 13 | CriminalCount | Total criminal convictions |
| 14 | InputAddrNBRHDMultiFamilyCount | Total number of multi-family properties in neighborhood |
| 14a | InputAddrNBRHDSingleFamilyCount | Total number of single family properties in neighborhood |
| 14b | InputAddrNBRHDBusinessCount | Total number of businesses in neighborhood |
| 15 | CurrAddrMedianIncome | Current address neighborhood median income based on U.S. Census data |
| 16 | ValidationAddrProblems | Indicates input address validation status - Invalid |
| 17 | SourceProperty | Indicates if identity is associated with the ownership of real property |
| 18 | InputAddrDelivery | Indicates the delivery sequence status of the input address - Vacant |
| 19 | SearchUnverifiedDOBCountYear | Number of searches in the last year for the identity using a date of birth that was not in the identity's record at the time of search |
| 20 | ArrestAge | Time since most recent arrest |
| 21 | SourceEducation | Indicates if identity attended or is attending college |
| 22 | InputAddrDwellType | Indicates input address dwelling type |
| 23 | AssocHighRiskTopologyCount | Total count of first-degree relatives or associates that are reported from high risk sources |
| 24 | SourceAssets | Indicates if identity is associated with the ownership of assets (vehicles, watercraft, and aircraft) |
| 25 | ValidationSSNProblems | Indicates SSN validation status - Invalid |
| 26 | SourcePhoneDirectoryAssistance | Indicates if identity has a phone listing in Electronic Directory Assistance (EDA) |

Figure 7:
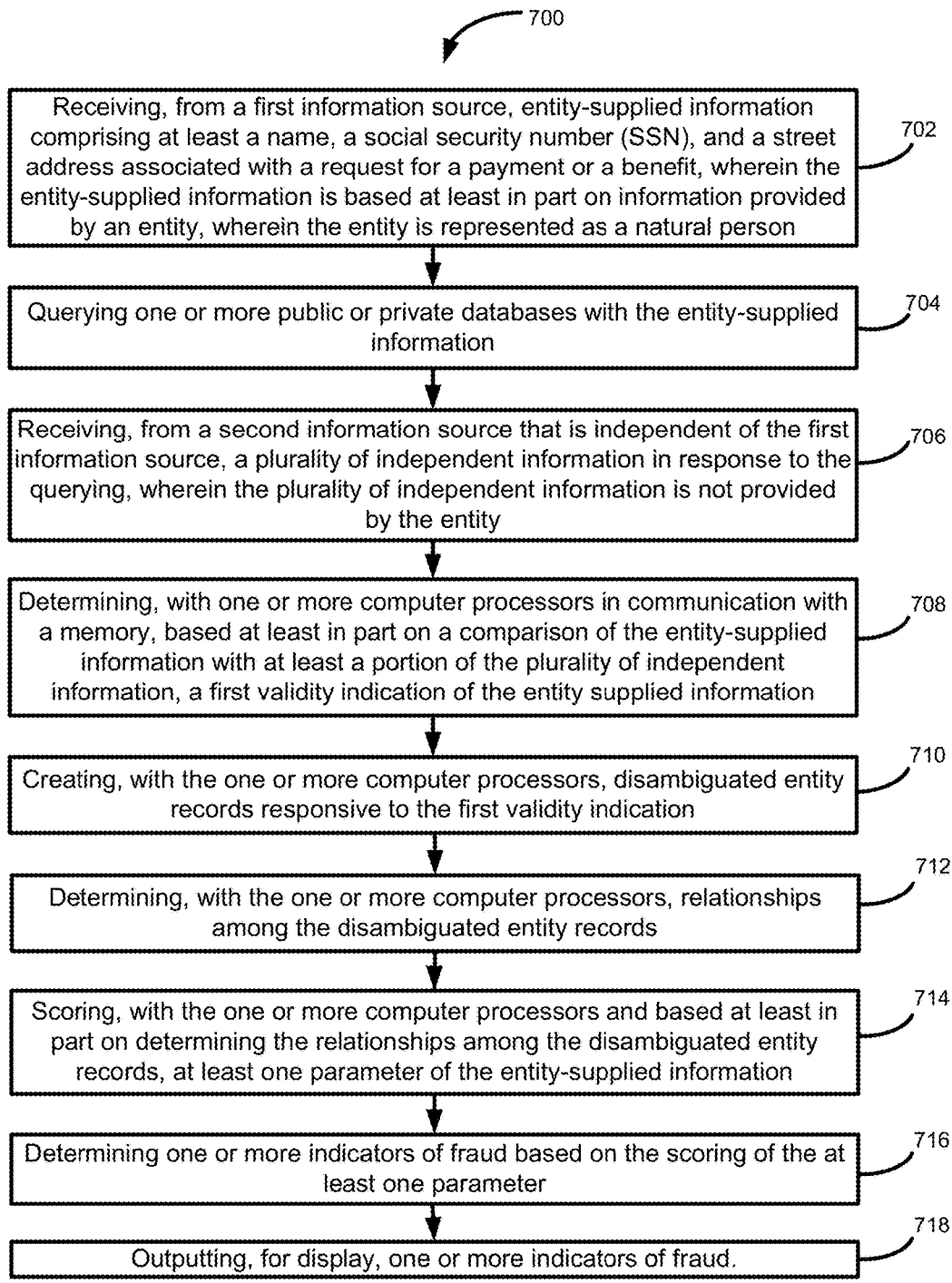
FIG. 7 is a flow diagram of a method 700 according to an exemplary embodiment of the disclosed technology.

An exemplary method 700 that may be utilized, for example, to increase computing efficiency, reduce time, and/or reduce memory utilization in the detection of identity-based fraud indicators, will now be described with reference to the flowchart of FIG. 7. The method 700 starts in block 702, and according to an exemplary embodiment of the disclosed technology includes receiving, from a first information source, entity-supplied information comprising at least a name, a social security number (SSN), and a street address associated with a request for a payment or a benefit, wherein the entity-supplied information is based at least in part on information provided by an entity, wherein the entity is represented as a natural person. In block 704, the method 700 includes querying one or more public or private databases with the entity-supplied information. In block 706, the method 700 includes receiving, from a second information source that is independent of the first information source, a plurality of independent information in response to the querying, wherein the plurality of independent information is not provided by the entity. In block 708, the method 700 includes determining, with one or more computer processors in communication with a memory, based at least in part on a comparison of the entity-supplied information with at least a portion of the plurality of independent information, a first validity indication of the entity-supplied information. In block 710, the method 700 includes creating, with the one or more computer processors, disambiguated entity records responsive to the first validity indication. Creating the disambiguated entity records, for example, may be performed by one or more of: performing data cleansing on one or more of the entity-supplied information and the plurality of independent information to eliminate one or more name variations; and adding metadata record to one or more of the entity-supplied information and the plurality of independent information. In block 712, the method 700 includes determining, with the one or more computer processors, relationships among the disambiguated entity records. Determining the relationships, for example, may be performed by one or more of: creating a core join data structure with at least a portion of all available disambiguated entity records; splitting the core join data structure into persisted parts; and clustering one or more of the persisted parts and the disambiguated entity records. In block 714, the method 700 includes scoring, with the one or more computer processors and based at least in part on determining the relationships among the disambiguated entity records, at least one parameter of the entity-supplied information. In block 716, the method 700 includes determining, with the one or more computer processors, one or more indicators of fraud based on the scoring of the at least one parameter. In block 718, the method 700 includes outputting, for display, one or more indicators of fraud.

According to an example implementation, the one or more parameters associated with the entity-supplied information may include a distance between the entity-supplied street address and a street address of one or more entity relatives or entity associates. According to an example implementation, the one or more parameters associated with the entity-supplied information may include a number of records associating the entity-supplied SSN and the entity-supplied street address. According to an example implementation, the one or more parameters associated with the entity-supplied information may include a number of unique SSNs associated with the entity-supplied street address. According to an example implementation, the one or more parameters associated with the entity-supplied information may include a number sources reporting the entity-supplied SSN with the entity-supplied name. According to an example implementation, the one or more parameters associated with the entity-supplied information may include a number of other entities associated with the entity-supplied SSN.

Certain example implementations further include scoring neighborhood fraud metrics based on the entity-supplied street address based on one or more of: presence of businesses in the surrounding neighborhood, density of housing in the neighborhood; and median income in the neighborhood.

In an example implementation, determining the validity indication of the entity supplied information further includes determining one or more of: whether entity is deceased; whether the entity is currently incarcerated; whether the entity has an incarceration record; time since incarceration if the entity has an incarceration record; whether the entity has been involved in a bankruptcy, and whether the entity-supplied address is included in public record.

According to an example implementation, the plurality of independent information includes, as applicable: an indication of whether or not the entity is deceased, and a date of death when the entity is indicated as deceased; independent address information associated with the entity; address validity information associated with the entity-supplied information; one or more records associated with the entity-supplied information; or no information.

In certain example implementations of the disclosed technology, receiving the plurality of independent information includes receiving the one or more records comprising one or more of housing records, vehicular records, marriage records, divorce records, hospital records, death records, court records, property records, incarceration records, tax records, and utility records, wherein the utility records comprise one or more of utility hookups, disconnects, and associated service addresses.

In certain example implementations of the disclosed technology, receiving the independent address information or the address validity information includes receiving one or more physical addresses of relatives or associates of the entity.

In an example implementation, the one or more public or private databases are independent of the government agency.

In an example implementation, receiving the entity-supplied information includes receiving the name, social security number (SSN), and street address associated with a request for a payment or a benefit from a government agency.

According to exemplary embodiments, certain technical effects are provided, such as creating certain systems and methods that detect fraud related to a request for payment or benefit. Exemplary embodiments of the disclosed technology can provide the further technical effects of providing systems and methods for determining and eliminating false positives with respect to fraud. Certain example embodiments include technical effects of providing systems and methods for disambiguating input information, resulting in higher quality determinations of fraudulent activities.

In exemplary embodiments of the disclosed technology, the fraud detection system(s) 201 300 may include any number of hardware and/or software applications that are executed to facilitate any of the operations. In exemplary embodiments, one or more I/O interfaces may facilitate communication between the fraud detection system 201 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the fraud detection system. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the fraud detection system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the fraud detection system and/or architecture with more or less of the components illustrated in FIG. 2 and FIG. 3.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

APPENDIX

SALT FOR RELATIONSHIP LINKING

**RELATIONSHIP:*relationshipname*:BASIS(*FieldList*):DEDUP(*FieldList*)**
**[:SCORE(*FieldList*)][:TRACK(FieldList)|MULTIPLE(*n*)|:SPLIT(*n*)]**
**[:THRESHOLD(*n*)][:BLOCKTHRESHOLD(*n*)]**

**RELATIONSHIP:*relationshipname:RelationshipList***
**[:MULTIPLE(*n*)] [:THRESHOLD(*n*)] [:BLOCKTHRESHOLD(*n*)]**
[:LINK(NONE|ALL|DIRECT|CROSS)]

| | |
|---|---|
| *relationshipname* | User-specified logical name for an entity relationship to be computed in the relationship module |
| **BASIS(*fieldlist*)** | Specifies the basis for the relationship using the list of fields specified in the *fieldlist* parameter. The *fieldlist* contains a list of field names separated by a colon ':' character which must be equal between record pairs. Fields specified in the *fieldlist* following a :?: must be equal or null (left.field = right.field or left.field=null or right.field=null). Fields following a :-: implies the fields must not match. Fuzzy matching of fields is not currently supported. |
| **DEDUP(*fieldlist*)** | Specifies a list of field names separated by the colon ':' character for deduping when matching record pairs between clusters to compute the relationship count. The DEDUP prevents overcounting when a cluster contains multiple records containing equal basis fields. Typically the fieldlist is the same as the fixed portion of the BASIS fieldlist. DEDUP fields must be part of the BASIS. |

| | |
|---|---|
| **SCORE(*fieldlist*)** | Specifies an optional list of fields separated by the colon ':' character which will be independently scored once per relationship. Fields following a :-: will be negated for the purpose of computing the threshold. SCORE fields cannot be part of the BASIS. |
| TRACK(fieldlist) | Specifies an optional list of RECORDDATE fields, to be used for tracking the dates over which relationship information is gathered. |
| **MULTIPLE(*n*)** | Specifies the minimum number of entity links n which must occur before a relationship is declared. |
| **SPLIT(*n*)** | Specifies the number of different persists that the main relationship join is split into (default if not specified is 1). Can improve performance and reduce disk space utilization. |
| **THRESHOLD(*n*)** | In SALT relationships are scored the same as internal linking, the same internal linking match threshold must be exceeded for a relationship to be declared (counted). The default threshold is the global default for internal linking. The THRESHOLD(n) parameter allows the default value to be overridden. |
| **BLOCKTHRESHOLD(*n*)** | BLOCKTHRESHOLD can be used to override the default block threshold used to compute relationships (which is five less than the overall default threshold). Lower numbers = more matches and slower times. |
| LINK(NONE\|ALL\|DIRECT\|CROSS | The LINK parameter is used to define how a given relationship is used to create link candidates for internal linking. The default is LINK(ALL). If LINK(NONE) is specified, the relationship will not take part in internal |

| | |
|---|---|
| | linking. If LINK(DIRECT) is specified, the relationship will cause the two sides of the relationship to be considered as possibly two halves of the same entity. If LINK(CROSS) is specified, then if D1 r D2 & D1 r D3, then Cross will cause D2 & D3 to be considered as possible entity link candidates. If LINK(A11) is specified, both the DIRECT & CROSS options are evaluated. Note: the relationship basis will be used to SUPPORT the fields of the basis in the matching logic. Thus if you have a BASIS of (fname:lname) — then the NAME concept will be SUPPORTed by whatever the basis score is. This gives a way to get a very strong score for a field match if 2 (or more) relatively weak values for that field match between two entities. (For a fuller explanation of SUPPORT — see ATTRIBUTEFILE) |
| RelationshipList | The second form of the RELATIONSHIP statement allows a relationship to be formed as the sum of other relationships. The *RelationshipList* parameter allows a list of relationship names separated by the colon ':' character to be specified. |

SALT internal linking provides the capability to cluster together records to form an entity. In some situations, the objective is not to determine that two records or clusters are close enough to become part of the same entity, but to determine if a statistically significant link exists between the two clusters and to record this relationship. The RELATIONSHIP statement provides this function.

When clustering single entities using SALT internal linking, there may be insufficient information within one record to perform a link even with propagation of field values. SALT internal linking will leave those records unmatched. Relationships provide a way to record instances when multiple occurrences of specific set of fields (the BASIS field list) matching between clusters provide an additional clue that a match may exist. For example, when a name match isn't strong, but a first name, middle name and two different last names matching between clusters is becoming a lot stronger. Relationships are not currently used automatically as part of SALT linking, however using the RELATIONSHIP statement SALT can produce an additional relationship file that can be used to create an ATTRIBUTEFILE as input to another SALT process. For example, if you have a relationship between entity ID1and ID2, the relationship file can be deduped and projected so that ID1⊠ID2 and ID2⊠ID1 are both in the file, then use an ATTRIBUTEFILE statement that declares one ID as the IDFIELD and the other ID as the VALUES field. See description below of the output format for a relationship file.

The core part of a SALT relationship is the BASIS; the basis is the list of fields which must be identical between two clusters for a linkage to exist. Fields following a :?: field in the basis field list must be identical or one must be null. Thus a relationship which counts and weighs the number of shared addresses between two clusters could be:

```
RELATIONSHIP:COHABIT:BASIS(PRIMNAME:PRIMRANGE:CITYNAME:ST:?:SECRANGE)
```

Note that the sec-range comes after the :?: that defines that either they must be equal or one must be null.

You can also a ATTRIBUTEFILE VALUES field as part of the BASIS for a relationship.

As it stands this would count all of the record-pairs between two clusters which match, however if a cluster had two or more copies of an address it could double count. To avoid this issue you also specify a DEDUP criteria as a field list to dedup. It would be normal for the DEDUP criteria to be the same as the fixed portion of the basis. However for addresses there can often be multiple names for one road and multiple ways of expressing one city. Thus it is usually safest to simply dedup using the prim_range. For example:

```
RELATIONSHIP:COHABIT:BASIS(PRIM_NAME:PRIM_RANGE:CITY_NAME:ST:?:SEC_RA
NGE):DEDUP(PRIM_RANGE)
```

It should be noted that the DEDUP performs a smart dedup, it will actually look for the strongest link found for a given value of a DEDUP field. In the example presented above, if a link had been found with and without the sec_range it will use the one which includes the sec-range value. If DEDUP is omitted, it defaults to the whole of the basis. SALT also checks to insure that all DEDUP elements are from the BASIS definition.

Within SALT relationship fields are scored the same as in internal linking and by default a linkage is declared if the internal linking match threshold is exceeded. This can be overridden using the THRESHOLD parameter on the RELATIONSHIP statement. As addresses usually have a specificity of around 28 it will generally then take 2 or more to cause a relationship to be declared. If you wish to force that a certain number of different links need to be found between clusters before declaring a relationship then you can use the :MULTIPLE(n) option. Here n is the minimum number of linkages that must have been found. A linkage occurs between any two entity identifiers which share a common value for a given basis.

Sometimes you want to be able to use other information in the record outside of the basis to support the declaration of a linkage but without requiring it as part of the basis. For example, sharing of one address between two identifiers is probably not significant but if the identifiers also share an SSN or share a last name there is more likelihood of a relationship. These supporting fields can be declared using the SCORE parameter on the RELATIONSHIP statement with its associated field list. For example:

```
RELATIONSHIP:COHABIT:BASIS(PRIM_NAME:PRIM_RANGE:CITY_NAME:ST:?:SEC_RA
NGE):DEDUP(PRIMRANGE):SCORE(SSN:LNAME)
```

The fields in the score list are independent and will be maximized across all of the linkages taking part in one relationship (if more than one RELATIONSHIP statement have the same field in the SCORE list, the highest score for that field will be used for all RELATIONSHIP statements).

An issue with relationships is getting them to run in a reasonable amount of time. Relationships are the classical n-squared process and the n-squared is true of both time and disk space. SALT does a lot of work to optimize this process which results in a light-weight self-joins being used in the generated ECL, but disk-space utilization could still be high. The SPLIT(n) parameter on the RELATIONSHIP statement allows the core join to be split into parts each of which is persisted. This has the advantage of breaking a potentially very long join into n parts (allowing others a time slice) but also reduces disk consumption by a factor of n (provided the eventual links are fairly sparse). In terms of performance it should be noted that if n can be made high enough that the output of each join does not spill to disk then the relationship calculation process will have significantly faster performance. The following example shows the use of the SPLIT(n) parameter:

```
RELATIONSHIP:COHABIT:BASIS(PRIM_NAME:PRIM_RANGE:CITY_NAME:ST:?:SEC_RA
NGE):SPLIT(16):SCORE(LNAME:SSN):DEDUP(PRIMRANGE)
```

It is possible to have multiple RELATIONSHIP statements defined in one specification file. Each RELATIONSHIP is independently computed. The output for the relationship specified will be in the following format:

```
CombinationRecord := RECORD
    unsigned6 ID1;
    unsigned6 ID2;
    unsigned2 Basis_score; // Score allocated to the basis
    relationship unsigned2 Dedup_Val; // Hash will be stored in here
    to dedup unsigned2 Cnt; // Number of different basis matches
    shared between // clusters
    unsigned1 LNAME_score; // Independent score for the LNAME field
    unsigned1 SSN_score; // Independent score for the SSN field END;
```

*ID1* and *ID2* are the entity IDs being linked. The *Basis_score* is the accumulated score across all of the (deduped) basis matches that form the relationship. The *Dedup_Val* field is used for computation and may be ignored. *Cnt* is the number of different basis matches being used in the relationship. Then will come a score for each score field which has been maximized across all the basis matches in the relationship. The total score used to determine whether or not the matching threshold is exceeded is *Basisscore+Lnamescore+SSN score*.

Any field (BASIS or SCORE) which is part of a CONCEPT definition will be weighted appropriately when used inside BASIS or SCORE.

Relationships and Dates

It is possible to track the dates over which relationship information is gathered; provided you have RECORDDATE fields in your SPC. Any relationship can have a track list. TRACKing is there to provide date information about the relationship - it does NOT change the relationship computation in any way (other than possibly making it a little slower). For example:

RELATIONSHIP:COHABIT:BASIS(PRIM_NAME:PRIM_RANGE:CITY_NAME:ST:?:SEC_RANGE):SCORE(LNAME:SSN):DEDUP(PRIM_RANGE):THRESHOLD(35):TRACK(dt_first_seen:dt_last_seen)

RELATIONSHIP:CONAME:BASIS(FNAME:LNAME):MULTIPLE(2):TRACK(dt_first_seen:dt_last_seen)

The system will then track for a 'first' date - the first date that BOTH elements of a relationship have a fact. For a 'last' date in is the last date that BOTH elements of a relationship share that fact. If a relationship is based upon multiple co-incidences it will find the earliest shared fact for a 'first' date and the latest shared fact for a last date. This is a slightly weird combination of mins and maxes - but semantically it works. As an example:

A lives at 123 Main Street from 19800101 to 19900101
B lives at 123 Main Street from 19850101 to 19870101
A lives at 456 High Street from 19900101 to 20000101
B lives at 456 High Street from 19870101 to 20100101

The system first computes the 'fact coincidence dates:

A&B share 123 Main Street from 19850101 to 19870101 (the shorter range when both are there)
A&B share 456 High Street from 19900101 to 200000101 (the shorter range when both are there)

Now the EARLIEST shared fact date is 19850101 and the latest shared fact date is 20000101. These represent an UPPER bound on the start of the relationship and a lower bound on the end of it.

NOTE: if shared facts do NOT overlap in time it is possible for the 'first' date to be after the 'last' date.

It is also possible to enforce some degree of date overlap within a single relationship. This is done by defining a RANGE field upon the two record dates. eg:

```
FIELD:dt_first_seen:RECORDDATE(FIRST,YYYYMM):5,0
FIELD:dt_last_seen:RECORDDATE(LAST,YYYYMM):5,0
RANGEFIELD:ReportedDate:RANGE(dt_first_seen,dt_last_seen):5,0
```

The two record-dates may be TRACKed if required (or not). ReportedDate can now be used as a (fairly) 'regular' field in the basis or score portion of a relationship. eg:

```
RELATIONSHIP:COHABIT:BASIS(PRIM_NAME:PRIM_RANGE:CITY_NAME:ST:?:SEC_RANGE
):SCORE(SSN:LNAME:REPORTEDDATE):DEDUP(PRIM_RANGE):THRESHOLD(35):TRACK(dt
```

```
_first_seen:dt_last_seen)
RELATIONSHIP:CONAME:BASIS(FNAME:LNAME:?:REPORTEDDATE):MULTIPLE(2):TRACK
(dt_first_seen)
RELATIONSHIP:COSSN:BASIS(SSN:REPORTEDDATE):SCORE(LNAME):THRESHOLD(35):TR
ACK(dtlastseen)
```

Notes:
1. In a score the Global specificity for a date overlap is used (same as in internal linking)
2. In the optional portion of a basis - the dates can overlap OR one record not have a date
3. In the fixed portion of a basis - there MUST be overlap in the dates. NOTE: A range field CANNOT be the ONLY (or FIRST) element of a basis

Combining Relationships with Different BASIS into a Single Relationship

It is also possible to define a relationship based upon other relationships. This is done using the relationship list. All relationships in the list must be normal relationships, grandparents are not allowed. This definition uses the second form of the RELATIONSHIP statement. Consider the following example which combines a COHABIT relationship with a COSSN relationship to form an association:

```
RELATIONSHIP:COHABIT:BASIS(PRIM_NAME:PRIM_RANGE:CITY_NAME:ST:?:SEC_RANGE
):SPLIT(16):SCORE(LNAME:SSN):DEDUP(PRIM_RANGE):THRESHOLD(30)
RELATIONSHIP:COSSN:BASIS(SSN):SCORE(LNAME):DEDUP(SSN):MULTIPLE(2)
RELATIONSHIP:ASSOC:COHABIT:COSSN
```

This has two normal relationships and one that associates the other two together into a unified score. It should be noted that because the normal relationships are eventually going to be wired together by an association, you may need to weaken them as shown in the example using the THRESHOLD statement. Thus the THRESHOLD(30) on COHABIT may be enough to capture a very rare single address (40 is the typical person threshold in the LexisNexis person data). For COSSN the MULTIPLE(2) parameter forces pairs of matching SSN for a relationship; this is an efficiency gained from the fact that a single SSN match is already being caught be the SCORE on COHABIT.

In principle ASSOC then simply combines the two underlying relationships together and adds the scores; it is therefore very efficient and uses the stored results of the two normal relationships.

However there is an issue in that between the child relationships there can easily be a lot of double-counting occurring because either:

a) Two relationships have identical fields in the SCORE attribute (in this case both have LNAME)
b) The SCORE attribute of one relationship might be part of the basis of another relationship (in this case COHABIT scores SSN which is part of the basis of COSSN)

SALT automatically picks this apart and:

a) Only picks the best score when multiple SCOREs clash
b) Assigns the SCORE from one relationship to the basis field of the other relationship and then does a MAX across those. (This is how a single SSN match gets picked up even though it is forbidden in COSSN).

Then the MULTIPLE and THRESHOLD parameters (or defaults) are applied to the child relationship. Thus a MULTIPLE(3) will require 3 different data matches to have occurred between COHABIT and COSSN.

A lot of the detail of the child relationships is preserved in the output generated for a combined relationship. The format for the ASSOC example would be:

```
shared ASSOCCRec:= RECORD
        unsigned6 ID1; unsigned6 ID2;
        unsigned2 Total_Score:= 0;
        unsigned2 Total Cnt 0;
        unsigned2 COHABIT_score:= 0;
        unsigned1 COHABIT_cnt:= 0;
        unsigned2 COSSN_score:= 0;
        unsigned1 COSSN_cnt:= 0;
        unsigned1 LNAME_score:= 0;
        // Score for SSN will be rolled into COSSN as it is part of
basis
        END
```

Individual keys are also built by SALT for all relationships which are of included as part of another relationship. In addition, a relationship service is built for each relationship that is not the child of another one. This service takes a UID (unique id) and a depth and will produce rolled up data for every relationship in the tree that many levels deep. The *tree walking* aspect of this service is in the *relationship_links* module. The tree is walked so that each level of the tree is joined to the branch before via the strongest link. At each level the IDI is the node being walked from and the ID2 is the node being walked to. The original node appears as a level 0 entry in ID2.

For example, using the *Sample_Input_Fileinternal AF Relationship_SPC* specification file in the SALT Examples module for internal linking produces the following results:

| | | |
|---|---|---|
| Result 1 | [2 rows] | Key::salt_test7::bdid::rel:cofein |
| Result 2 | [120 rows] | Key::salt_test7::bdid::rel:assoc |
| Match Sample Records | | |
| Slice Cut Candidates | | |
| Specificities | | |
| SPC Shift | | |
| Pre Clusters | | |
| Post Clusters | | |
| Pre Cluster Count | | |
| Post Cluster Count | | |
| Matches Performed | | 305 |
| Basic Matches Performed | | 132 |
| Slices Performed | | 14 |
| Rule Efficacy | [7 rows] | |
| Confidence Levels | [73 rows] | |
| Propagation Assisted Pcnt | | 17.04918032786885 |
| Propagation Required Pcnt | | 5.573770491803279 |
| Pre Pop Stats | [1 rows] | |
| Post Pop Stats | [1 rows] | |
| Validity Statistics | [1 rows] | |
| Id Consistency4 | [1 rows] | |
| Result 22 | [1 rows] | key::salt_test7::bdid::debug::specificities_debug |
| Result 23 | [148375 rows] | key::salt_test7::bdid::debug::match_candidates_debug |
| Result 24 | [152 rows] | key::salt_test7::bdid::datafile::attribute_matches |
| Result 25 | [437 rows] | key::salt_test7::bdid::debug::match_sample_debug |
| Result 26 | [148375 rows] | key::salt_test7::bdid::datafile::patched_candidates |
| Result 27 | [151475 rows] | temp::bdid::salt_test7::it1 |
| Result 28 | [6620 rows] | temp::bdid::salt_test7::change_it1 |

Result 1 is the file produced by the COFEIN relationship. This file contains the following results:

|   | bdid1 | bdid2 | basis score | dedup val | cnt | company name score |
|---|-------|-------|-------------|-----------|-----|--------------------|
| 1 | 37178850 | 292680203 | 22 | 54286 | 2 | 11 |
| 2 | 292680203 | 37178850 | 22 | 54286 | 2 | 11 |

Result 2 is the file produced by the top-level relationship called ASSOC. contains the following results:

|    | bdid1 | bdid2 | collocate score | collocate cnt | cofein score | cofein cnt | company name score | total cnt | total score |
|----|-------|-------|-----------------|---------------|--------------|------------|--------------------|-----------|-------------|
| 1  | 28318440 | 81815873 | 12 | 1 | 0 | 0 | 11 | 1 | 23 |
| 2  | 31178850 | 292680203 | 0 | 0 | 22 | 2 | 11 | 2 | 23 |
| 3  | 41434192 | 42443948 | 13 | 1 | 0 | 0 | 11 | 1 | 24 |
| 4  | 42443948 | 41434192 | 13 | 1 | 0 | 0 | 11 | 1 | 24 |
| 5  | 81815873 | 28318440 | 12 | 1 | 0 | 0 | 11 | 1 | 23 |
| 6  | 82061141 | 286051048 | 9 | 1 | 11 | 0 | 8 | 1 | 28 |
| 7  | 176223914 | 387316952 | 12 | 1 | 0 | 0 | 11 | 1 | 23 |
| 8  | 286051048 | 82061141 | 9 | 1 | 11 | 0 | 8 | 1 | 28 |
| 9  | 292680203 | 37178850 | 0 | 0 | 22 | 2 | 11 | 2 | 33 |
| 10 | 387316952 | 176223914 | 12 | 1 | 0 | 0 | 11 | 1 | 23 |
| 11 | 408311407 | 408973906 | 12 | 1 | 0 | 0 | 11 | 1 | 23 |
| 12 | 408973906 | 408311407 | 12 | 1 | 0 | 0 | 11 | 1 | 23 |
| 13 | 427653229 | 994817609 | 10 | 1 | 11 | 0 | 4 | 1 | 25 |
| 14 | 994817609 | 427653229 | 10 | 1 | 11 | 0 | 4 | 1 | 25 |

What is claimed is:

1. A computer-implemented method comprising:
receiving, from a first information source, entity-supplied information comprising at least a name, a social security number (SSN), and a street address associated with a request for a payment or a benefit, wherein the entity-supplied information is based at least in part on information provided by an entity, wherein the entity is represented as a natural person;
querying one or more public or private databases with the entity-supplied information;
receiving, from a second information source that is independent of the first information source, a plurality of independent information in response to the querying, wherein the plurality of independent information is not provided by the entity;
determining, with one or more computer processors in communication with a memory, based at least in part on a comparison of the entity-supplied information with at least a portion of the plurality of independent information, a first validity indication of the entity-supplied information;
creating, with the one or more computer processors, disambiguated entity records responsive to the first validity indication by one or more of:
performing data cleansing on one or more of the entity-supplied information and the plurality of independent information to eliminate one or more name variations; and
adding metadata to one or more of the entity-supplied information and the plurality of independent information;
determining, with the one or more computer processors, relationships among the disambiguated entity records by one or more of:
creating a core join data structure with at least a portion of all available disambiguated entity records;
splitting the core join data structure into persisted parts, wherein the persisted parts are configured for updating a shared structure between versions in the memory to reduce disk utilization; and
clustering one or more of the persisted parts and the disambiguated entity records;
scoring, with the one or more computer processors and based at least in part on determining the relationships among the disambiguated entity records, at least one parameter of the entity-supplied information;
determining, with the one or more computer processors, one or more indicators of fraud based on the scoring of the at least one parameter; and
outputting, for display, one or more indicators of fraud.

2. The method of claim 1, wherein the at least one parameter of the entity-supplied information comprises a distance between the entity-supplied street address and a street address of one or more entity relatives or entity associates.

3. The method of claim 1, wherein the at least one parameter of the entity-supplied information comprises a number of records associating the entity-supplied SSN and the entity-supplied street address.

4. The method of claim 1, wherein the at least one parameter of the entity-supplied information comprises a number of unique SSNs associated with the entity-supplied street address.

5. The method of claim 1, wherein the at least one parameter of the entity-supplied information comprises a number of sources reporting the entity-supplied SSN with the entity-supplied name.

6. The method of claim 1, wherein the at least one parameter of the entity-supplied information comprises a number of other entities associated with the entity-supplied SSN.

7. The method of claim 1, further comprising scoring neighborhood fraud metrics based on the entity-supplied street address and further based on one or more of: presence of businesses in the surrounding neighborhood; density of housing in the neighborhood; and median income in the neighborhood.

8. The method of claim 1, wherein determining the first validity indication of the entity-supplied information further comprises determining one or more of: whether entity is deceased; whether the entity is currently incarcerated; whether the entity has an incarceration record; time since incarceration if the entity has an incarceration record; and whether the entity has been involved in a bankruptcy.

9. The method of claim 1, wherein the plurality of independent information includes one or more of: an indication of whether or not the entity is deceased; a date of death when the entity is indicated as deceased; independent address information associated with the entity; address validity information associated with the entity-supplied information; and one or more records associated with the entity-supplied information; or no information.

10. The method of claim 1, wherein receiving the plurality of independent information comprises receiving one or more records comprising one or more of housing records, vehicular records, marriage records, divorce records, hospital records, death records, court records, property records, incarceration records, tax records, and utility records, wherein the utility records comprise one or more of utility hookups, disconnects, and associated service addresses.

11. The method of claim 1, wherein receiving the independent information comprises receiving one or more physical addresses of relatives or associates of the entity.

12. The method of claim 1, wherein the one or more public or private databases are independent of a government agency.

13. The method of claim 1, wherein receiving the entity-supplied information comprises receiving the name, SSN, and street address is associated with the request for the payment or the benefit from a government agency.

14. A system comprising:
at least one memory for storing data and computer-executable instructions; and
at least one processor configured to access the at least one memory and further configured to execute the computer-executable instructions to:
receive, from a first information source, entity-supplied information comprising at least a name, a social security number (SSN), and a street address associated with a request for a payment or a benefit, wherein the entity-supplied information is based at least in part on information provided by an entity, wherein the entity is represented as a natural person;
query one or more public or private databases with the entity-supplied information;
receive, from a second information source that is independent of the first information source, a plurality of independent information in response to the querying, wherein the plurality of independent information is not provided by the entity;

determining, with the at least one processor and based at least in part on a comparison of the entity-supplied information with at least a portion of the plurality of independent information, a first validity indication of the entity-supplied information;

create, with the at least one processor, disambiguated entity records responsive to the first validity indication by one or more of:

performing data cleansing on one or more of the entity-supplied information and the plurality of independent information to eliminate one or more name variations; and adding metadata to one or more of the entity-supplied information and the plurality of independent information;

determine, with the at least one processor, relationships among the disambiguated entity records by one or more of:

creating a core join data structure with at least a portion of all available disambiguated entity records;

splitting the core join data structure into persisted parts, wherein the persisted parts are configured for updating a shared structure between versions in the memory to reduce disk utilization; and clustering one or more of the persisted parts and the disambiguated entity records;

score, with the at least one processor and based at least in part on determining the relationships among the disambiguated entity records, at least one parameter of the entity-supplied information;

determine, with the at least one processor, one or more indicators of fraud based on the scoring of the at least one parameter; and output, for display, one or more indicators of fraud.

15. The system of claim 14, wherein the at least one parameter of the entity-supplied information comprises one or more of:

a distance between the entity-supplied street address and a street address of one or more entity relatives or entity associates;

a number of records associating the entity-supplied SSN and the entity-supplied street address;

a number of unique SSNs associated with the entity-supplied street address;

a number of sources reporting the entity-supplied SSN with the entity-supplied name; and a number of other entities associated with the entity-supplied SSN.

16. The system of claim 14, wherein the at least one processor is further configured to score neighborhood fraud metrics based on the entity-supplied street address and further based on one or more of: presence of businesses in the surrounding neighborhood; density of housing in the neighborhood; and median income in the neighborhood.

17. The system of claim 14, wherein the first validity indication of the entity-supplied information is further determined based one or more of: whether entity is deceased; whether the entity is currently incarcerated; whether the entity has an incarceration record; time since incarceration if the entity has an incarceration record; and whether the entity has been involved in a bankruptcy.

18. The system of claim 14, wherein the plurality of independent information includes one or more of: an indication of whether or not the entity is deceased; a date of death when the entity is indicated as deceased; independent address information associated with the entity; address validity information associated with the entity-supplied information; one or more records associated with the entity-supplied information, housing records, vehicular records, marriage records, divorce records, hospital records, death records, court records, property records, incarceration records, tax records, and utility records, wherein the utility records comprise one or more of utility hookups, disconnects, and associated service addresses.

19. The system of claim 14, wherein receiving the independent information comprises receiving one or more physical addresses of relatives or associates of the entity.

20. One or more computer readable media comprising computer-executable instructions that, when executed by one or more processors, configure the one or more processors to perform the method of:

receiving, from a first information source, entity-supplied information comprising at least a name, a social security number (SSN), and a street address associated with a request for a payment or a benefit, wherein the entity-supplied information is based at least in part on information provided by an entity, wherein the entity is represented as a natural person;

querying one or more public or private databases with the entity-supplied information;

receiving, from a second information source that is independent of the first information source, a plurality of independent information in response to the querying, wherein the plurality of independent information is not provided by the entity;

determining, based at least in part on a comparison of the entity-supplied information with at least a portion of the plurality of independent information, a first validity indication of the entity-supplied information;

creating disambiguated entity records responsive to the first validity indication by one or more of:

performing data cleansing on one or more of the entity-supplied information and the plurality of independent information to eliminate one or more name variations; and adding metadata to one or more of the entity-supplied information and the plurality of independent information;

determining, with the one or more computer processors, relationships among the disambiguated entity records by one or more of:

creating a core join data structure with at least a portion of all available disambiguated entity records;

splitting the core join data structure into persisted parts, wherein the persisted parts are configured for updating a shared structure between versions in the memory to reduce disk utilization; and clustering one or more of the persisted parts and the disambiguated entity records; scoring, based at least in part on determining the relationships among the disambiguated entity records, at least one parameter of the entity-supplied information;

determining one or more indicators of fraud based on the scoring of the at least one parameter; and outputting, for display, one or more indicators of fraud.

* * * * *